US012758975B2

(12) United States Patent
Nagrath et al.

(10) Patent No.: US 12,758,975 B2
(45) Date of Patent: Oct. 13, 2026

(54) HIGH THROUGHPUT WHOLE BLOOD INERTIAL FOCUSING DEVICE AND METHOD OF USE

(71) Applicant: THE REGENTS OF THE UNIVERSITY OF MICHIGAN, Ann Arbor, MI (US)

(72) Inventors: Sunitha Nagrath, Ann Arbor, MI (US); Daniel F. Hayes, Ann Arbor, MI (US); Kaylee J. Smith, St. Paul, MN (US)

(73) Assignee: REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 460 days.

(21) Appl. No.: 18/570,340

(22) PCT Filed: Jul. 6, 2022

(86) PCT No.: PCT/US2022/036209
§ 371 (c)(1),
(2) Date: Dec. 14, 2023

(87) PCT Pub. No.: WO2023/283235
PCT Pub. Date: Jan. 12, 2023

(65) Prior Publication Data

US 2024/0278239 A1 Aug. 22, 2024

Related U.S. Application Data

(60) Provisional application No. 63/219,196, filed on Jul. 7, 2021.

(51) Int. Cl.
*B01L 3/00* (2006.01)

(52) U.S. Cl.
CPC ..... *B01L 3/502761* (2013.01); *B01L 3/50273* (2013.01); *B01L 2200/0636* (2013.01);
(Continued)

(58) Field of Classification Search
CPC ........... B01L 3/502761; B01L 3/50273; B01L 2200/0636; B01L 2200/0647;
(Continued)

(56) References Cited

U.S. PATENT DOCUMENTS 10,144,009 B2 12/2018 Bhagat et al.
10,150,116 B2 12/2018 Kapur et al.
(Continued)

FOREIGN PATENT DOCUMENTS

WO WO-2020/207456 A1 10/2020

OTHER PUBLICATIONS

Agnoletto et al., Heterogeneity in Circulating Tumor Cells: The Relevance of the Stem-Cell Subset, Cancers, 11(4): 483 (Apr. 2019).

(Continued)

*Primary Examiner* — Kathryn Elizabeth Limbaugh
(74) *Attorney, Agent, or Firm* — MARSHALL, GERSTEIN & BORUN LLP

(57) ABSTRACT

A microfluidic device for focusing circulating tumor cells (CTCs) from whole blood without a sheath buffer includes a first section and a second section. The first section includes a single flow channel having a plurality of square corners, and the second section includes at least one flow channel having a plurality of curves positioned in a serpentine arrangement. A method of using the device including pumping a whole blood sample through the microfluidic device at a flow rate of approximately 2.4 mL/min to separate CTC enriched blood from waste.

20 Claims, 18 Drawing Sheets

(52) U.S. Cl.
CPC .................. *B01L 2200/0647* (2013.01); *B01L 2300/0883* (2013.01); *B01L 2400/0475* (2013.01)

(58) Field of Classification Search
CPC ..... B01L 2200/0652; B01L 2300/0883; B01L 2300/0864; B01L 2400/0475
See application file for complete search history.

(56) References Cited

U.S. PATENT DOCUMENTS

| | | | |
|---|---|---|---|
| 2014/0227777 A1 | 8/2014 | Choi et al. | |
| 2016/0139015 A1 | 5/2016 | Di Carlo et al. | |
| 2017/0080425 A1 | 3/2017 | Toner et al. | |
| 2019/0276814 A1 | 9/2019 | Edd et al. | |
| 2020/0086322 A1 | 3/2020 | Amini et al. | |

OTHER PUBLICATIONS

Amini et al., Inertial microfluidic physics, Lab Chip, 14: 2739-2761 (2014).
Ashworth, A Case of Cancer in Which Cells Similar to Those in the Tumours Were Seen in the Blood after Death., Med. J. Aust., 14: 146-147 (1869).
Bagnall et al., Deformability of Tumor Cells versus Blood Cells, Sci. Rep., 5: 1-11 (2015).
Bankó et al., Technologies for circulating tumor cell separation from whole blood, J. Hematol. Oncol., 12(1): 48 (2019).
Cobain et al., in *Recent Results in Cancer Research*, 215: 147-160 (2020).
Di Carlo et al., Continuous inertial focusing, ordering, and separation of particles in microchannels, Proc Natl Acad Sci USA, 104(48): 18892-7 (Nov. 2007).
Di Carlo, Inertial microfluidics., Lab Chip, 9: 3038-3046 (2009).
Hao et al., Size-based separation methods of circulating tumor cells, Adv. Drug Deliv. Rev., 125: 3-20 (2018).
How the Cellsearch® CTC Test Works?, https://www.cellsearchctc.com/about-cellsearch/how-; cellsearch-ctc-test-works, (accessed Jan. 29, 2021).
Hvichia et al., A novel microfluidic platform for size and deformability based separation and the subsequent molecular characterization of viable circulating tumor cells, Int. J. Cancer, 138: 2894-2904 (2016).
Immunicon Corporation Announces FDA Clearance of CellSearch Circulating Tumor Cell Kit, https://www.meddeviceonline.com/doc/immunicon-corporation-announces-fda-clearance-0001 (Mar. 2020).
International Application No. PCT/US22/36209, International Search Report and Written Opinion, mailed Nov. 17, 2022.
Jack et al., Ultra-specific isolation of circulating tumor cells enables rare-cell RNA profiling, Adv. Sci., 3.9:1600063 (2016).
Kim et al., A temporary indwelling intravascular aphaeretic system for in vivo enrichment of circulating tumor cells, Nat. Commun., 10: 1478 (2019).
Kim et al., Cascaded spiral microfluidic device for deterministic and high purity continuous separation of circulating tumor cells, Biomicrofluidics, 8: 1-13 (2014).
Kozminsky et al., The incorporation of microfluidics into circulating tumor cell isolation for clinical applications, Curr. Opin. Chem. Eng., 11: 59-66 (2016).
Li et al., Continuous-flow microfluidic blood cell sorting for unprocessed whole blood using surface-micromachined microfiltration membranes, Lab Chip, 14(14): 2565-2575 (Jul. 2014).
Lin et al., High-throughput microfluidic labyrinth for the label-free isolation of circulating tumor cells, Cell Systems, 5.3:295-304 (2017).
Miller et al., Significance of Circulating Tumor Cells Detected by the CellSearch System in Patients with Metastatic Breast Colorectal and Prostate Cancer, J. Oncol., 2010: 1-8 (2010).
Murlidhar et al., Affinity Versus Label-Free Isolation of Circulating Tumor Cells: Who Wins?, Small, 12: 4450-4463 (2016).
Myung et al., Microfluidic devices to enrich and isolate circulating tumor cells, Lab Chip, 15(24): 4500-4511 (Dec. 2015).
Nagrath et al., Isolation of rare circulating tumour cells in cancer patients by microchip technology, Nature, 450: 1235-1239 (2007).
Ozbey et al., Inertial focusing of cancer cell lines in curvilinear microchannels, Micro Nano Eng., 2: 53-63 (2019).
Paoletti et al., Development of circulating tumor cell-endocrine therapy index in patients with hormone receptor-positive Breast Cancer, Clin. Cancer Res., 21: 2487-2498 (2015).
Paoletti et al., Circulating Biomarkers and Resistance to Endocrine Therapy in Metastatic Breast Cancers: Correlative Results from AZD9496 Oral SERD Phase I Trial, Clin. Cancer Res., 24: 5860-5872 (2018).
Paoletti et al., Comprehensive Mutation and Copy Number Profiling in Archived Circulating Breast Cancer Tumor Cells Documents Heterogeneous Resistance Mechanisms, Cancer Res., 78: 1110-1122 (2018).
Sarioglu et al., A microfluidic device for label-free, physical capture of circulating tumor cell clusters., Nat. Methods, 12: 685-91 (2015).
Sequist et al., The CTC-chip: an exciting new tool to detect circulating tumor cells in lung cancer patients., J. Thorac. Oncol., 4: 281-3 (2009).
Serum total protein—Wikipedia, https://en.wikipedia.org/wiki/Serum_total_protein, (accessed Dec. 29, 2020).
Smith et al., Inertial focusing of circulating tumor cells in whole blood at high flow rates using the microfluidic CTCKey™ device for CTC enrichment, Lab on a Chip, 21.18:3559-72 (2021).
Tamminga et al., Detection of circulating tumor cells in the diagnostic leukapheresis product of non-small-cell lung cancer patients comparing cellsearch® and ISET, Cancers (Basel)., 12(4): 896 (Apr. 2020).
Wang et al., PD-L1 Expression in Circulating Tumor Cells Increases during Radio(chemo) therapy and Indicates Poor Prognosis in Non-small Cell Lung Cancer, Sci. Rep. 9(1): 566 (Jan. 2019).
Warkiani et al., Slanted spiral microfluidics for the ultra-fast, label-free isolation of circulating tumor cells., Lab Chip, 14: 128-37 (2014).
Warkiani et al., Ultra-fast, label-free isolation of circulating tumor cells from blood using spiral microfluidics, Nat. Protoc., 11: 134-148 (2016).
Yin et al. Microfluidics-based approaches for separation and analysis of circulating tumor cells, TrAC—Trends Anal. Chem., 117: 84-100 (Aug. 2019).
Zhou et al., Viscoelastic microfluidics: progress and challanges, Microsystems Nanoeng., 6:113 (Dec. 2020).
Zhou et al., Isolation of cells from whole blood using shear-induced diffusion, Sci. Rep., 8(1): 9411 (Jun. 2018).

| Flow Rate (uL/min) | Reynold's Number | WBC Particle Reynold's Number | CTC Particle Reynold's Number |
|---|---|---|---|
| 3600 | 240.00 | 0.94 | 2.11 |
| 3200 | 213.33 | 0.83 | 1.88 |
| 2800 | 186.67 | 0.73 | 1.64 |
| 2400 | 160.00 | 0.63 | 1.41 |
| 2000 | 133.33 | 0.52 | 1.17 |
| 1600 | 106.67 | 0.47 | 0.94 |
| 1200 | 80.00 | 0.31 | 0.70 |
| 800 | 53.33 | 0.21 | 0.47 |
| 600 | 40.00 | 0.16 | 0.35 |
| 400 | 26.67 | 0.10 | 0.23 |
| 200 | 13.33 | 0.05 | 0.12 |

| Flow Rate (uL/min) | Reynold's Number | Dean's Number | WBC Particle Reynold's Number | CTC Particle Reynold's Number |
|---|---|---|---|---|
| 853 | 113.76 | 53.63 | 0.44 | 1.00 |
| 758 | 101.12 | 47.67 | 0.40 | 0.89 |
| 664 | 88.48 | 41.71 | 0.35 | 0.78 |
| 569 | 75.84 | 35.75 | 0.30 | 0.67 |
| 474 | 63.20 | 29.79 | 0.25 | 0.56 |
| 379 | 50.56 | 23.83 | 0.20 | 0.44 |
| 284 | 37.92 | 17.88 | 0.15 | 0.33 |
| 190 | 25.28 | 11.92 | 0.10 | 0.22 |
| 142 | 18.96 | 8.94 | 0.07 | 0.17 |
| 95 | 12.64 | 5.96 | 0.05 | 0.11 |
| 47 | 6.32 | 2.98 | 0.02 | 0.06 |

| Flow Rate (uL/min) | Reynold's Number | WBC Particle Reynold's Number | CTC Particle Reynold's Number |
|---|---|---|---|
| 3600 | 241.81 | 0.94 | 2.13 |
| 3200 | 214.94 | 0.84 | 1.89 |
| 2800 | 188.07 | 0.73 | 1.65 |
| 2400 | 161.21 | 0.63 | 1.42 |
| 2000 | 134.34 | 0.52 | 1.18 |
| 1600 | 107.47 | 0.42 | 0.94 |
| 1200 | 80.60 | 0.31 | 0.71 |
| 800 | 53.74 | 0.21 | 0.47 |
| 600 | 40.30 | 0.16 | 0.35 |
| 400 | 26.87 | 0.10 | 0.24 |
| 200 | 13.43 | 0.05 | 0.12 |

| Flow Rate (uL/min) | Reynold's Number | Dean's Number | WBC Particle Reynold's Number | CTC Particle Reynold's Number |
|---|---|---|---|---|
| 853 | 114.62 | 54.03 | 0.45 | 1.01 |
| 758 | 101.88 | 48.03 | 0.40 | 0.90 |
| 664 | 89.15 | 42.02 | 0.35 | 0.78 |
| 569 | 76.41 | 36.02 | 0.30 | 0.67 |
| 474 | 63.68 | 30.02 | 0.25 | 0.56 |
| 379 | 50.94 | 24.01 | 0.20 | 0.45 |
| 284 | 38.21 | 18.01 | 0.15 | 0.34 |
| 190 | 25.47 | 12.01 | 0.10 | 0.22 |
| 142 | 19.10 | 9.01 | 0.07 | 0.17 |
| 95 | 12.74 | 6.00 | 0.05 | 0.11 |
| 47 | 6.37 | 3.00 | 0.02 | 0.06 |

| Flow Rate (uL/min) | Reynold's Number | WBC Particle Reynold's Number | CTC Particle Reynold's Number |
|---|---|---|---|
| 3600 | 243.61 | 0.95 | 2.14 |
| 3200 | 216.55 | 0.85 | 1.90 |
| 2800 | 189.48 | 0.74 | 1.67 |
| 2400 | 162.41 | 0.63 | 1.43 |
| 2000 | 135.34 | 0.53 | 1.19 |
| 1600 | 108.27 | 0.42 | 0.95 |
| 1200 | 81.20 | 0.32 | 0.71 |
| 800 | 54.14 | 0.21 | 0.48 |
| 600 | 40.60 | 0.16 | 0.36 |
| 400 | 27.07 | 0.11 | 0.24 |
| 200 | 13.53 | 0.05 | 0.12 |

| Flow Rate (uL/min) | Reynold's Number | Dean's Number | WBC Particle Reynold's Number | CTC Particle Reynold's Number |
|---|---|---|---|---|
| 853 | 115.47 | 54.43 | 0.45 | 1.01 |
| 758 | 102.64 | 48.39 | 0.40 | 0.90 |
| 664 | 89.81 | 42.34 | 0.35 | 0.79 |
| 569 | 76.98 | 36.29 | 0.30 | 0.68 |
| 474 | 64.15 | 30.24 | 0.25 | 0.56 |
| 379 | 51.32 | 24.19 | 0.20 | 0.45 |
| 284 | 38.49 | 18.14 | 0.15 | 0.34 |
| 190 | 25.66 | 12.10 | 0.10 | 0.23 |
| 142 | 19.25 | 9.07 | 0.08 | 0.17 |
| 95 | 12.83 | 6.05 | 0.05 | 0.11 |
| 47 | 6.42 | 3.02 | 0.03 | 0.06 |

Flow Rate
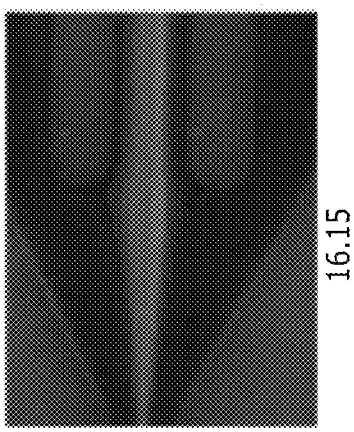
FIG. 7A
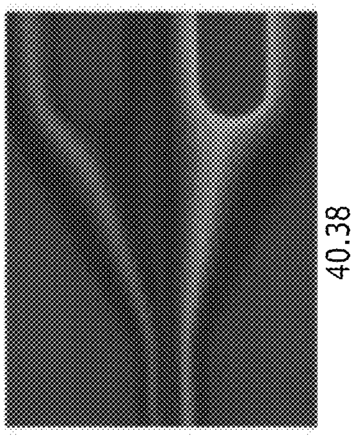
FIG. 7B
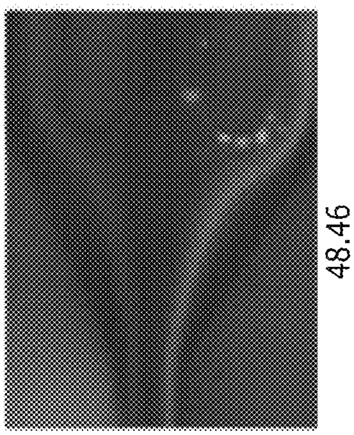
FIG. 7C
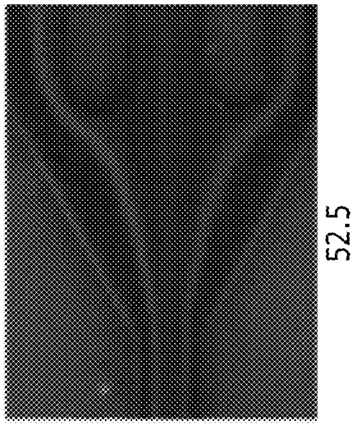
FIG. 7D
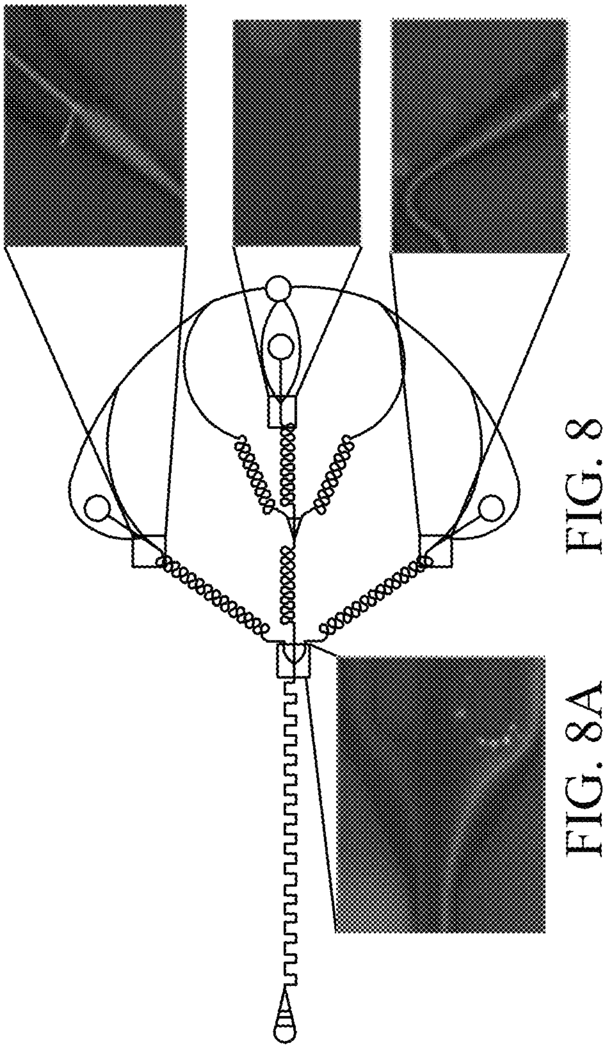
FIG. 8A
FIG. 8B
FIG. 8C
FIG. 8D
FIG. 8

FIG. 9A FIG. 9B
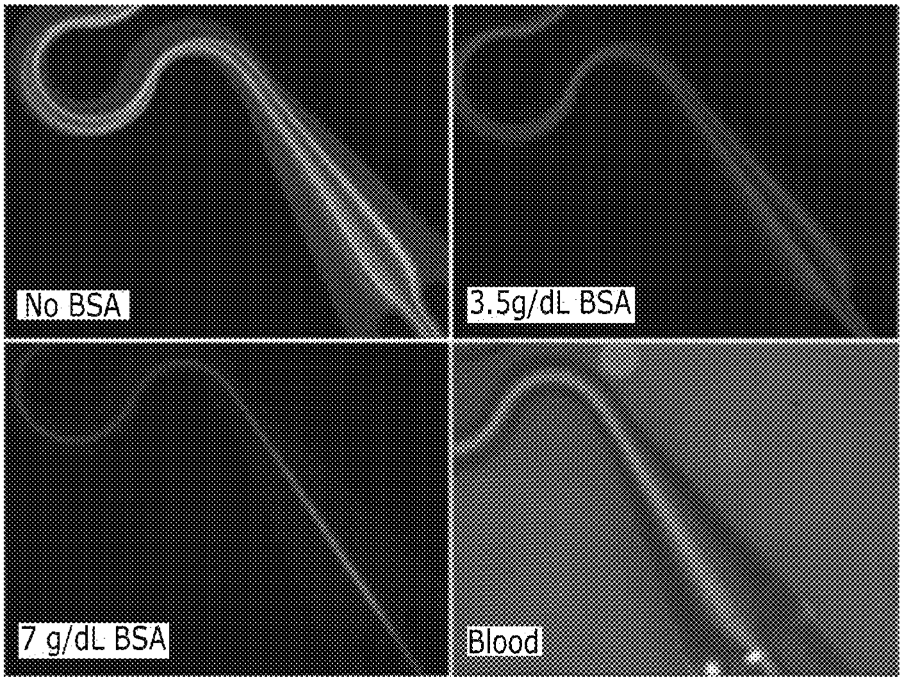
FIG. 9C FIG. 9D
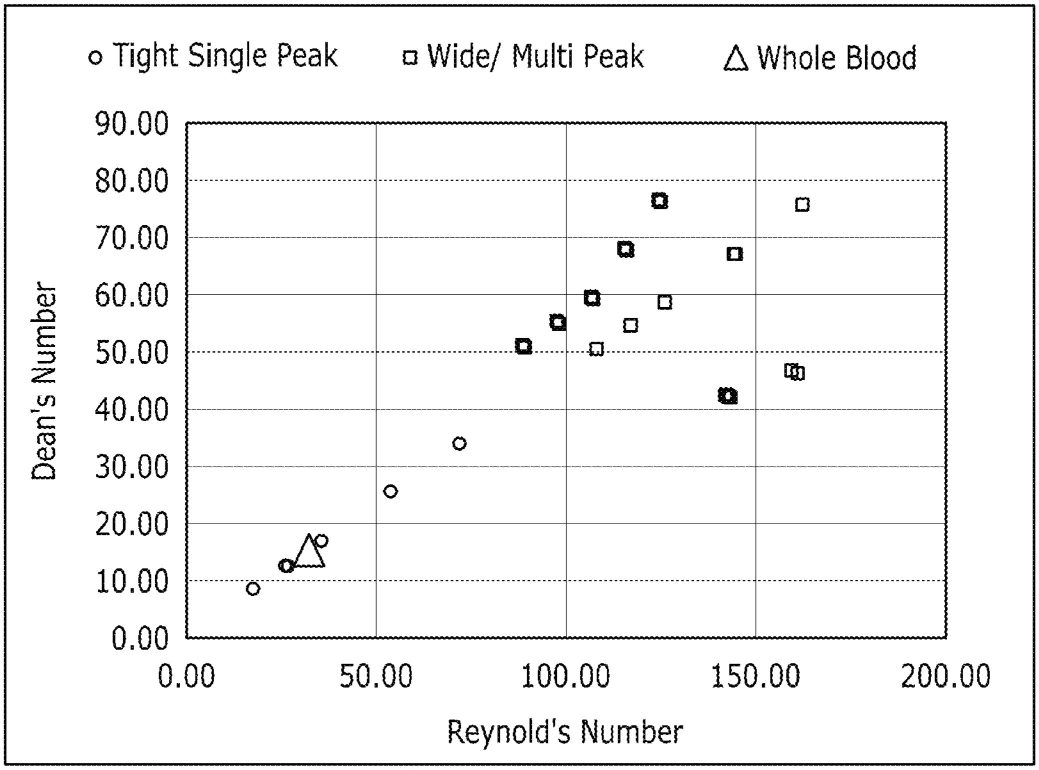
FIG. 10

HIGH THROUGHPUT WHOLE BLOOD INERTIAL FOCUSING DEVICE AND METHOD OF USE

FIELD OF THE DISCLOSURE

This disclosure relates generally to a microfluidic device and method of use, and specifically to a microfluidic device for focusing circulating tumor cells (CTCs) by pumping a whole blood sample first through a flow channel having a plurality of square corners and then through at least one serpentine flow channel.

BACKGROUND

Circulating tumor cells (CTCs) are extremely rare cells shed from tumors into the blood stream with approximately 10 CTCs/mL compared to 106 other nucleated cells/mL. These cells can provide valuable information about their tumor of origin and direct treatment decisions to improve patient outcomes. Current technologies isolate CTCs from a limited blood volume and often require pre-processing that leads to CTC loss, making it difficult to isolate enough CTCs to perform in-depth tumor analysis. Many inertial microfluidic devices have been developed to isolate CTCs at high flow rates, but they typically require either blood dilution, pre-processing to remove red blood cells, or a sheath buffer rather than being able to isolate cells directly from whole blood. Pre-processing adds additional steps where cell loss could occur while also increasing the processing time. Dilution and sheath buffers both increase the volume of fluid that must be processed thereby increasing the processing time, while further diluting the already low CTC concentration.

SUMMARY

The present disclosure is directed to a high throughput inertial device, which focuses cells in unprocessed whole blood, forgoing the need for pre-processing that was necessary in previous devices. Although directly processing whole blood without a sheath buffer dramatically decreases processing time, it adds the challenge of focusing in a fluid high in particle interactions. The disclosed device includes two sections that focus CTCs into tight streamlines without the use of a sheath buffer or dilution despite the particle interactions. The disclosed device permits detection of higher numbers of CTCs in more patients with epithelial malignances, while also isolating CTCs that are not captured using current ligand-based methods. The device thus improves application of precision oncology by providing clinicians with additional information regarding patients with malignancy.

In accordance with an example, a microfluidic device for focusing circulating tumor cells (CTCs) from whole blood without a sheath buffer includes a first section including a single flow channel, the single flow channel including a plurality of square corners. The microfluidic device further includes a second section in fluid communication with the first section, the second section including at least one flow channel including a plurality of curves positioned in a serpentine arrangement.

In some forms, the single flow channel of the first section may divide at a first split of the second section into a top flow channel, a middle flow channel, and a bottom flow channel. The top flow channel may include a plurality of curves positioned in a serpentine arrangement. The middle flow channel may include a first segment and a second segment. Each of the first segment and the second segment may include a plurality of curves positioned in a serpentine arrangement. The bottom flow channel may include a plurality of curves positioned in a serpentine arrangement.

In other forms, the top flow channel may taper at a top outlet to two top outer waste passageways and a top central focus passageway. The first segment may taper at a second split into two primary middle outer waste passageways and the second segment. The second segment may taper at a middle outlet to two secondary middle outer waste passageways and a middle central focus passageway. The bottom flow channel may taper at a bottom outlet to two bottom outer waste passageways and a bottom central focus passageway.

In still other forms, the microfluidic device may further include a pump configured to pump whole blood through the first section and the second section at a flow rate between 1.0 and 5.0 mL/min. The single flow channel of the first section may have a width between 350 μm and 450 μm. The single flow channel may have a length between 43 mm and 53 mm. The number of the plurality of square corners of the single flow channel may be between 55 and 65. The top flow channel, the first segment and the second segment of the middle flow channel, and the bottom flow channel may all have a width between 50 μm and 250 μm.

In additional forms, the plurality of curves of the top flow channel, the first segment and the second segment of the middle flow channel, and the bottom flow channel may each have a radius between 150 μm and 350 μm. The number of the plurality of curves of the top flow channel may be between 20 and 24 and the number of the plurality of curves of the bottom flow channel may be between 20 and 24. The number of the plurality of curves of the first segment of the middle flow channel may be between 11 and 16, and the number of the plurality of curves of the second segment of the middle flow channel being between 11 and 16. The single flow channel, the top flow channel, the middle flow channel, and the bottom flow channel may all having a height between 50 μm and 125 μm.

According to an example, a method of focusing circulating tumor cells (CTCs) from whole blood using a microfluidic device includes providing a whole blood sample and a microfluidic device, the microfluidic device having a first section including a single flow channel, the single flow channel including a plurality of square corners, and a second section in fluid communication with the first section, the second section including a first split where the single flow channel of the first section divides into a top flow channel, a middle flow channel, and a bottom flow channel, each of the top flow channel, the middle flow channel, and the bottom flow channel including a plurality of curves positioned in a serpentine arrangement. The method further includes pumping the whole blood sample through the microfluidic device at a flow rate between 1.0 and 5.0 mL/min, and separating CTC enriched blood from waste.

In some forms, the CTC enriched blood may have a volume that is 25% or less of a volume of the whole blood sample. The method may further include, at the first split, flowing between 20% and 30% of the whole blood sample by volume through the top flow channel, flowing between 20% and 30% of the whole blood sample by volume through the bottom flow channel, and flowing between 40% and 60% of the whole blood sample by volume through the middle flow channel.

In other forms, the method may include the top flow channel tapering at a top outlet, the bottom flow channel tapering at a bottom outlet, and the middle flow channel including a first segment, a second split, a second segment, and a middle outlet. At each of the top outlet, the bottom outlet, the second split, and the middle outlet, between 60% and 70% of the whole blood sample by volume may be directed into waste passageways and 40-30% of the whole blood sample by volume may be directed into focus passageways as CTC enhanced blood. The method may further include directing the CTC enhanced blood into a herringbone graphene oxide device (HBGO).

In additional forms, the single flow channel, the top flow channel, the middle flow channel, and the bottom flow channel may all have a height between 50 μm and 125 μm. The single flow channel of the first section may have a width between 350 μm and 450 μm. The top flow channel, the middle flow channel, and the bottom flow channel may all have a width between 50 μm and 250 μm.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 7A is an image of pre-fluoresced MCF7 cells focusing in whole blood shown at the first split of the microfluidic device of FIGS. 1 and 2 at a flow rate of 800 μL/min and a Reynold's number of 16.15.

FIG. 7B is an image of pre-fluoresced MCF7 cells focusing in whole blood shown at the first split of the microfluidic device of FIGS. 1 and 2 at a flow rate of 2000 μL/min and a Reynold's number of 40.38.

FIG. 7C is an image of pre-fluoresced MCF7 cells focusing in whole blood shown at the first split of the microfluidic device of FIGS. 1 and 2 at a flow rate of 2400 μL/min and a Reynold's number of 48.46.

FIG. 7D is an image of pre-fluoresced MCF7 cells focusing in whole blood shown at the first split of the microfluidic device of FIGS. 1 and 2 at a flow rate of 2600 μL/min and a Reynold's number of 52.5.

FIG. 8 is a schematic of the microfluidic device of the present disclosure as also shown in FIG. 2.

FIG. 8A is an image of pre-fluoresced MCF7 cells focusing in whole blood in the microfluidic device of FIG. 8 at the first split.

FIG. 8B is an image of pre-fluoresced MCF7 cells focusing in whole blood in the microfluidic device of FIG. 8 at the top outlet.

FIG. 8C is an image of pre-fluoresced MCF7 cells focusing in whole blood in the microfluidic device of FIG. 8 at the middle outlet.

FIG. 8D is an image of pre-fluoresced MCF7 cells focusing in whole blood in the microfluidic device of FIG. 8 at the bottom outlet.

FIG. 9A is an image at the bottom outlet of the microfluidic device of FIGS. 1, 2, and 8 at a flow rate of 2,400 μL/min inlet flow rate with no BSA.

FIG. 9B is an image at the bottom outlet of the microfluidic device of FIGS. 1, 2, and 8 at a flow rate of 2,400 μL/min inlet flow rate with 3.5 g/dL BSA.

FIG. 9C is an image at the bottom outlet of the microfluidic device of FIGS. 1, 2, and 8 at a flow rate of 2,400 μL/min inlet flow rate with 7 g/dL BSA.

FIG. 9D is an image at the bottom outlet of the microfluidic device of FIGS. 1, 2, and 8 at a flow rate of 2,400 μL/min inlet flow rate with blood.

FIG. 10 is a Reynold's vs. Dean's number graph.

DETAILED DESCRIPTION OF THE DRAWINGS

Figures 1, 1A, 1B:
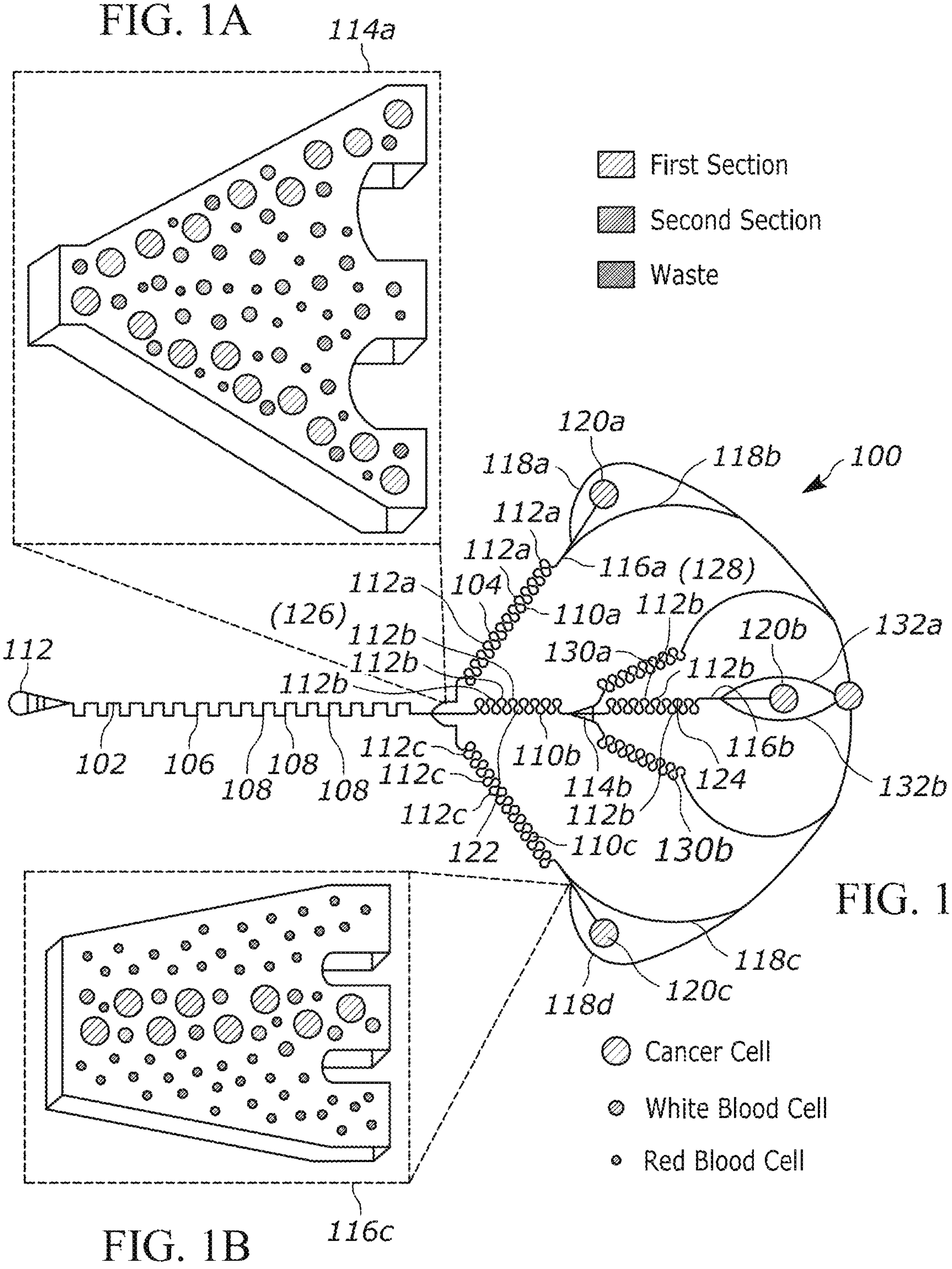
FIG. 1 is a top schematic view of a microfluidic device of the present disclosure for purposes of showing fluid flow through the microfluidic device.
FIG. 1A is an enlarged view of the first split of the microfluidic device of FIG. 1.
FIG. 1B is an enlarged view of the bottom outlet of the second section of the microfluidic device of FIG. 1.

FIG. 1 illustrates the flow patterns of whole blood through a microfluidic device 100 as circulating tumor cells (CTCs) are focused from the whole blood. The microfluidic device 100 has a first section 102 and a second section 104. The first section 102 includes a single flow channel 106. The single flow channel 106 has a plurality of square corners 108. For purposes of this disclosure, a "square corner" is a corner that has an angle that is close to 90 degrees and is specifically between 75 and 105 degrees.

The second section 104 is in fluid communication with the first section 102. The second section 104 includes at least one flow channel 110. In the arrangement shown in FIG. 1, the second section 104 has three flow channels 110: a top flow channel 110*a*, a middle flow channel 110*b*, and a bottom flow channel 110*c*. Each flow channel 110*a*, 110*b*, and 110*c* includes, respectively, a plurality of curves 112*a*, 112*b*, and 112*c* positioned in a serpentine arrangement. That is, each flow channel 110*a*, 110*b*, and 110*b* first curves in a first direction around a first center point at a first longitudinal location and then curves in a second direction around a second center point at a second longitudinal direction downstream of the first longitudinal location, with the first direction and the second direction being substantially opposite one another so as to result in a serpentine arrangement.

In the arrangement shown in FIG. 1, a fluid, such as whole blood, enters the first section 102 at an inlet 112 of the single flow channel 106. The fluid travels through the plurality of square corners 108. At a first split 114*a* (enlarged in FIG. 1A), the fluid is divided such that a first portion flows through the top flow channel 110*a*, a second portion flows through the middle flow channel 110*b*, and a third portion flows through the bottom flow channel 110*c*.

As shown in FIG. 1, after its plurality of curves 112*a*, the top flow channel 110*a* tapers at a top outlet 116*a* to two top outer waste passageways 118*a* and 118*b* and to a top central focus passageway 120*a*. Accordingly, the first portion that enters the top flow channel 110*a* flows through the plurality of curves 112*a*. At the end of the plurality of curves 112*a*, inertia causes the waste fluid to flow through the two top outer waste passageways 118*a* and 118*b*. Meanwhile, the CTC cells are directed by inertia to the top central focus passageway 120*a* such that CTC enriched blood flows through the top central focus passageway 120*a*.

Likewise, as shown in FIG. 1, after its plurality of curves 112*c*, the bottom flow channel 110*c* tapers at a bottom outlet 116*c* (enlarged in FIG. 1B) to two bottom outer waste passageways 118*c* and 118*d* and to a bottom central focus passageway 120*c*. Accordingly, the third portion that enters the bottom flow channel 110*c* flows through the plurality of curves 112*c*. At the end of the plurality of curves 112*c*, inertia causes the waste fluid to flow through the bottom outer waste passageways 118*c* and 118*d*. Meanwhile, the CTC cells are directed by inertia to the bottom central focus passageway 120*c* such that CTC enriched blood flows through the bottom central focus passageway 120*c*.

In contrast, the middle flow channel 110*b* has a first segment 122 and a second segment 124. The first segment 122 has a first subset 126 of the plurality of curves 112*b* positioned in a serpentine arrangement, and the second segment 124 has a second subset 128 of the plurality of curves 112*b* positioned in a serpentine arrangement. The first segment 122 tapers at a second split 114*b* into two primary middle outer waste passageways 130*a* and 130*b* and to the second segment 124. The second segment 122 tapers at a middle outlet 116*b* to two secondary middle outer waste passageways 132*a* and 132*b* and a middle central focus passageway 120*b*. Accordingly, the second portion that enters the middle flow channel 110*b* flows through the first subset 126 of the plurality of curves 112*b*. At the end of the first subset 126 of the plurality of curves 112*b*, inertia causes waste fluid to flow through the two primary middle outer waste passageways 130*a* and 130*b*. Meanwhile, the CTC cells are directed by inertia to the second segment 124 such that CTC enriched blood flows through the second segment 124. The CTC enriched blood flows through the second subset 128 of the plurality of curves 112*b*. At the end of the second subset 128 of the plurality of curves 112*b*, inertia causes waste fluid to flow at a middle outlet 116*b* through the two secondary middle outer waste passageways 132*a* and 132*b*. Meanwhile, the CTC cells are directed by inertia into the middle central focus passageway 120*b* such that further CTC enriched blood flows through the middle central focus passageway 120*b*.

The arrangement discussed herein only performs multiple focusing of the CTC enriched blood in the middle flow channel 110*b* for purposes of space conservation. That is, only the middle flow channel 110*b* has both a first segment 122 and a second segment 124 that allows waste to be removed at two focal points (i.e., the second split 114*b* and the middle outlet 116*b*). The advantage of this arrangement is that it conserves space, allowing the microfluidic device 100 to occupy a fairly narrow footprint. Further, the middle flow channel 110*b* reduces pressure within the microfluidic device 100 by having a first segment 122 and a second segment 124. However, in other arrangements not depicted herein, the top flow channel 110*a* and the bottom flow channel 110*c* may likewise have multiple segments that allow waste to be removed at multiple focal points.

Figures 2, 2A, 2B, 2C, 2D, 2E:
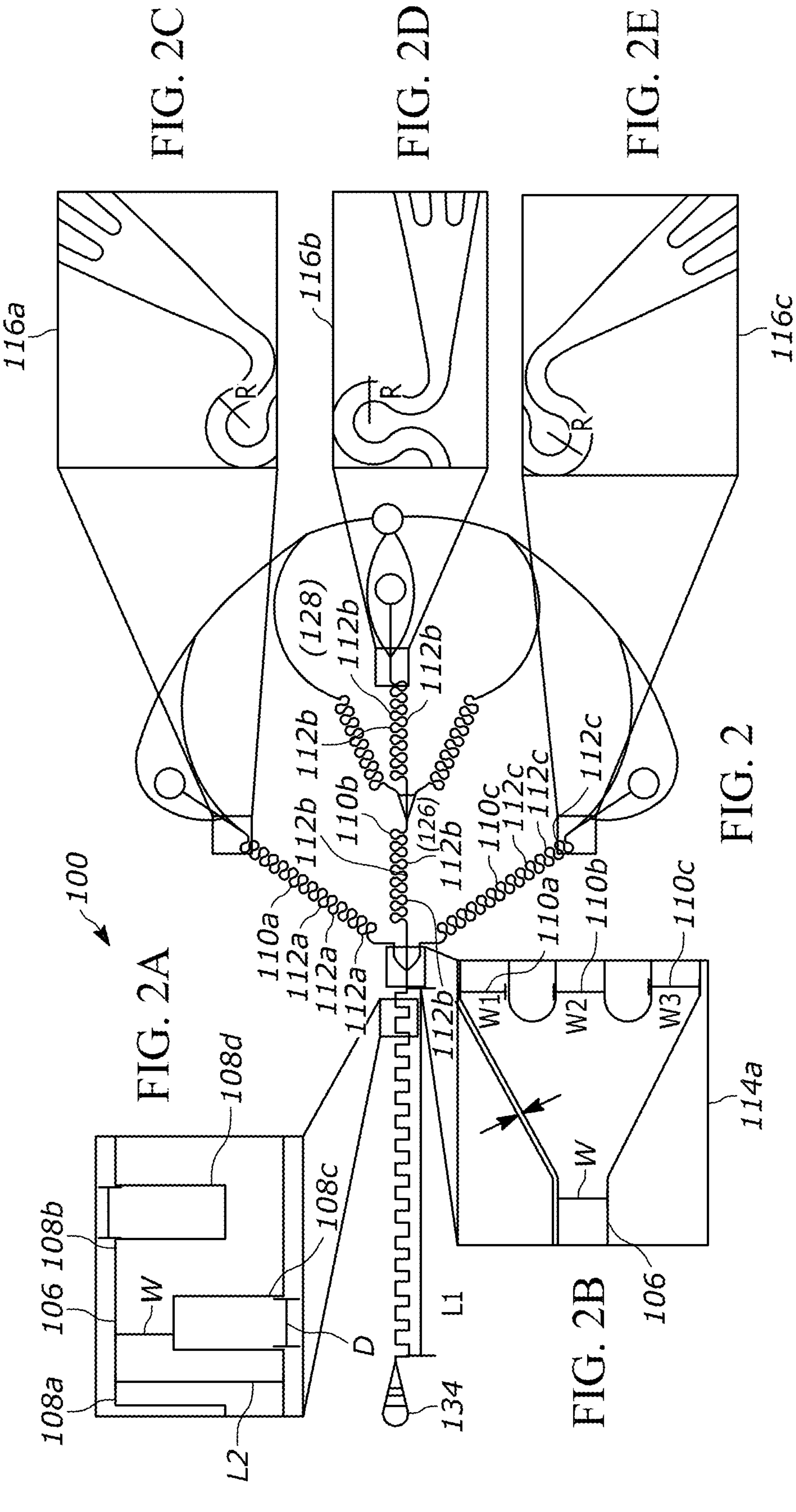
FIG. 2 is a top schematic view of the microfluidic device of FIG. 1 for purposes of showing structural components of the microfluidic device.
FIG. 2A is an enlarged view of the first section of the microfluidic device of FIG. 2.
FIG. 2B is an enlarged view of the first split of the microfluidic device of FIG. 2.
FIG. 2C is an enlarged view of a top outlet of the second section of the microfluidic device of FIG. 2.
FIG. 2D is an enlarged view of a middle outlet of the second section of the microfluidic device of FIG. 2.
FIG. 2E is an enlarged view of a bottom outlet of the second section of the microfluidic device of FIG. 2.

Turning to FIG. 2, additional structural details about microfluidic device 100 are provided in the enlarged views shown in FIGS. 2A-2E. As shown in FIG. 2, the microfluidic device 100 further comprises a pump 134 (shown schematically) configured to pump whole blood through the first section and the second section at a flow rate between 1.0 and 5.0 mL/min. In particular, a flow rate of 2.4 mL/min is optimal. A range around 2.4 mL/min, such as 2.0-2.8 may be another appropriate flow rate.

FIG. 2A shows an enlarged view of the single flow channel 106 of the first section 102. The plurality of square corners 108 change a direction of the turn every two square corners. That is, as shown in FIG. 2A, fluid flowing in the single flow channel 106 turns right at a first of the plurality of square corners 108*a*, turns right again at a second of the plurality of square corners 108*b*, then turns left at a third of the plurality of square corners 108*c*, then turns left again at a fourth of the plurality of square corners 108*d*, and then the pattern repeats. The result is that the single flow channel 106 has a three-sided square pattern that proceeds overall in a generally straight line. The overall length L1 of the single flow channel 106 is preferably between 43 and 53 mm, and is 48 mm in the arrangement shown in FIG. 2. The number of the plurality of square corners 108 is preferably between 55 and 65, and is 60 are in the arrangement shown in FIG. 2A.

As also shown in FIG. 2A, the single flow channel 106 has a width W between 300 and 500 μm. Preferably, the single flow channel 106 has a width W between 350 and 450 μm. In the arrangement shown in FIG. 2A, the single flow channel 106 has a width W of 400 μm. Additionally, in the arrangement shown in FIG. 2A, each segment of adjacent one of the plurality of square corners 108 has a length L2 of 1200 μm. This is because the internal distance D between each of the plurality of square corners is equal to the width W of the single flow channel 106, i.e. is 400 μm in the arrangement shown in FIG. 2A.

FIG. 2B shows the first split 114*a*. As shown, the first split 114*a* tapers outwardly from the original width of the single flow channel 106 to form a fan-out area upstream of the top flow channel 110*a*, the middle flow channel 110*b*, and the bottom flow channel 110*c*. In the arrangement shown, the single flow channel 106 has a width W that is 400 μm, and each of the top flow channel 110*a*, the middle flow channel 110*b*, and the bottom flow channel 110*c* have a respective width Wa, Wb, and Wc that is preferably between 50 μm and 250 μm. In the arrangement shown, the widths Wa, Wb, and We are all equal to 200 μm. Also shown in FIG. 2B is that the single flow channel 106 and the top flow channel 110*a*, the middle flow channel 110*b*, and the bottom flow channel 110 *c* all have a height H between 50 μm and 125 μm. In particular, in the arrangement shown in FIGS. 1 and 2, the height H is equal to 100 μm.

FIGS. 2C, 2D, and 2E show the top outlet 116*a*, middle outlet 116*b*, and bottom outlet 116*c* respectively. As shown in FIGS. 20, 2D, and 2D, the respective plurality of curves 112*a*, 112*b*, and 112*c* each have curves having a radius R preferably between 150 μm and 350 μm. In the arrangement shown in FIGS. 20, 2D, and 2E, the radii R are 200 μm. The number of curves of the plurality of curves 112*a* of the top flow channel 110*a* is preferably between 20 and 24. In the arrangement shown in FIG. 2, the number of curves of the plurality of curves 112*a* of the top flow channel 110*a* is 22. The number of curves of the plurality of curves 112*c* of the bottom flow channel 110*c* is preferably between 20 and 24. In the arrangement shown in FIG. 2, the number of curves of the plurality of curves 112*c* of the bottom flow channel 110*c* is 22. The number of curves of the plurality of curves 112*b* in the first subset 126 is preferably between 11 and 16. In the arrangement shown in FIG. 2, the number of curves of the plurality of curves 112*b* in the first subset 126 is 13. The number of curves of the plurality of curves 112*b* in the second subset 128 is preferably between 11 and 16. In the arrangement shown in FIG. 2, the number of curves of the plurality of curves 112*b* in the first subset 126 is 14.

Figure 3:
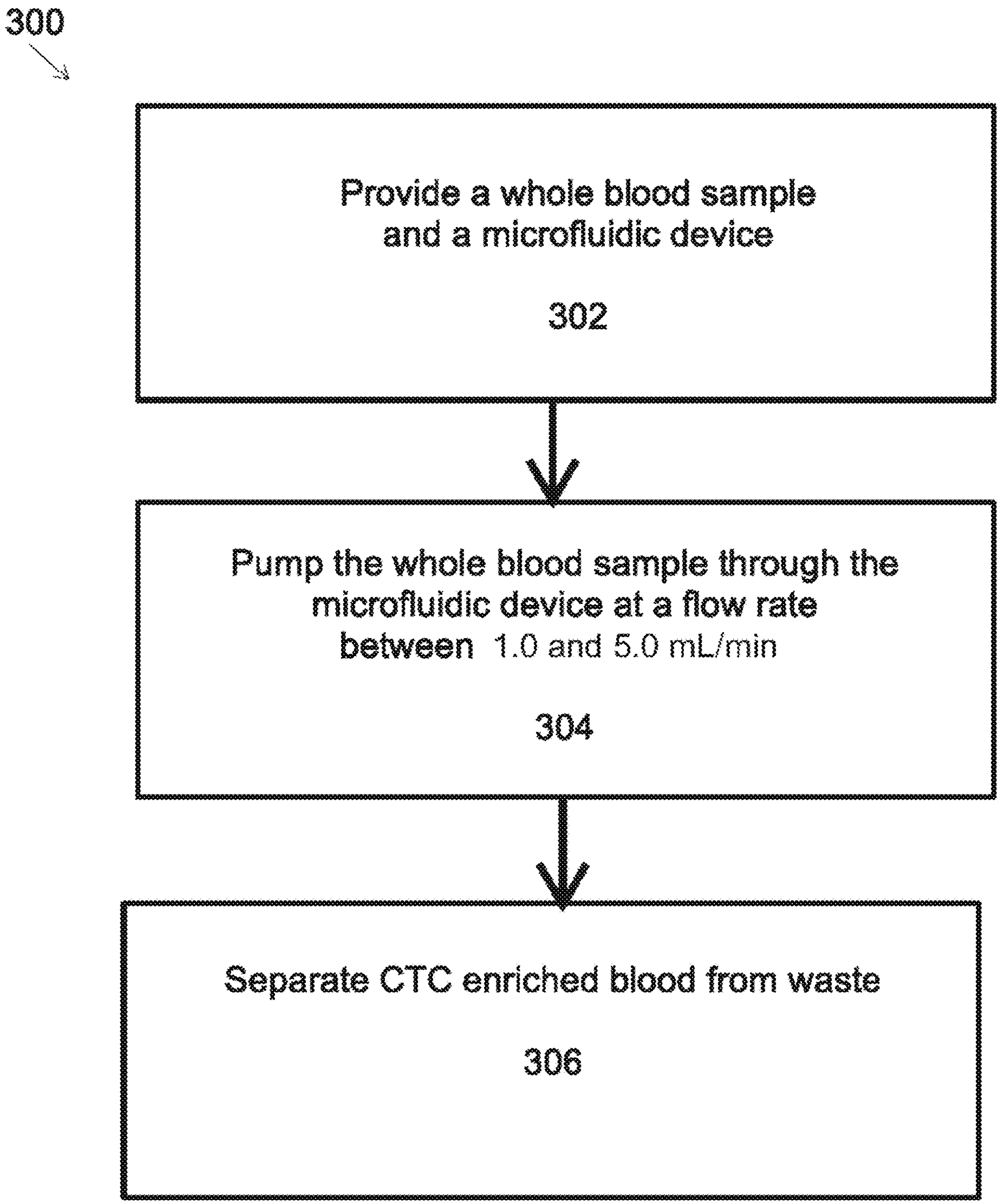
FIG. 3 illustrates schematically a method of using the microfluidic device of FIGS. 1 and 2.

FIG. 3 illustrates a method 300 of focusing circulating tumor cells (CTCs) from whole blood using a microfluidic device. At box 302, the method includes providing a whole blood sample and a microfluidic device. The microfluidic device may be the microfluidic device 100 discussed above. In particular, the microfluidic device of the method 300 has a first section (e.g., first section 102) including a single flow channel (e.g., single flow channel 106), the single flow channel including a plurality of square corners (e.g., plurality of square corners 108), and a second section (e.g., second section 104) in fluid communication with the first section, the second section including a first split (e.g., first split 114*a*) where the single flow channel of the first section divides into a top flow channel (e.g., top flow channel 110*a*), a middle flow channel (e.g., middle flow channel 110*b*), and a bottom flow channel (e.g., bottom flow channel 110*c*), each of the top flow channel, the middle flow channel, and the bottom flow channel including a plurality of curves (e.g., plurality of curves 112) positioned in a serpentine arrangement. At box 304, the method includes pumping the whole blood sample through the microfluidic device at a flow rate between 1.0 and 5.0 mL/min. At box 306, the method includes separating CTC enriched blood from waste.

The method 300 may include the CTC enriched blood having a volume that is 25% or less of a volume of the whole blood sample. The method 300 may further include at the first split, flowing between 20% and 30% of the whole blood sample by volume through the top flow channel, flowing between 20% and 30% of the whole blood sample by volume through the bottom flow channel, and flowing between 40% and 60% of the whole blood sample by volume through the middle flow channel. The method 300 may include the top flow channel tapering at a top outlet (e.g., top outlet 116*a*), the bottom flow channel tapering in a bottom outlet (e.g., bottom outlet 116*c*), and the middle flow channel including a first segment (e.g., first segment 122), a second split (e.g., second split 114*b*), a second segment (e.g., second segment 124), and a middle outlet (e.g., middle outlet 116*b*). At each of the top outlet, the bottom outlet, the second split, and the middle outlet, the method 300 may include directing between 60% and 70% of the whole blood sample by volume into waste passageways and 40-30% of the whole blood sample by volume into focus passageways as CTC enhanced blood. The method 300 may further include directing the CTC enhanced blood into a herringbone graphene oxide device (HBGO). In the method 300, the single flow channel, the top flow channel, the middle flow channel, and the bottom flow channel may all have a height between 50 μm and 125 μm. The single flow channel of the first section may have a width between 350 μm and 450 μm. The top flow channel, the middle flow channel, and the bottom flow channel may all have a width between 50 μm and 250 μm.

Using the method 300, the microfluidic device 100 device reaches a previously unobtained 5-fold CTC enrichment from whole blood at a flow rate at or around 2.4 mL/min. By using the microfluidic device 100 to pre-enrich the CTCs, larger volumes of blood can be processed rapidly which leads to more CTCs for robust downstream analysis. For example, known processes in the prior art process 7.5 mL, but pre-enrichment with the microfluidic device 100 would allow for interrogation of the equivalent of 43 mL of undiluted blood in its 7.5 mL sample which is over a 5-fold increase.

FIGS. 4A-15 are directed to results from testing the functionality of the microfluidic device 100. Multiple microfluidic devices 100 were fabricated using the manufacturer's SU8-100 (Kayaku, USA) protocol to make silicon wafers (Kayaku, USA). The silicon wafers were then treated with silane (Sigma, USA) for two hours. Polydimethylsiloxane (PDMS) (Ellsworth Adhesives, USA) was prepared with the curing agent at a 10:1 ratio and poured on top of the SU8 mold. The PDMS was degassed using a desiccator for 1-2 hours then placed in a 70° C. oven overnight to cure. The microfluidic devices 100 were then peeled from the mold and 0.75 mm holes were punched for the inlet and outlet tubing. A plasma etcher was used to bond the devices to glass slides and tubing was attached.

Cultured human breast cancer MCF7 cells and were obtained from ATCC and cultured at 37° C. and 5% CO2 in Dulbecco's Modified Eagle Medium (Invitrogen, USA) with 10% fetal bovine serum (Sigma, USA) and 1% Antibiotic-Antimycotic (Invitrogen, USA) added. For cell maintenance, media was changed every 2-3 days and cells were passaged when they reached 60-80% confluency. For experimentation, cells were seeded into cell culture dishes 3-5 days before experimentation. Cells were passaged at 70-80% confluency using TrypLE then tracker dyed using Cell Tracker Green CMFDA Dye (Invitrogen, USA). Cells were live during experimentation and used immediately.

Whole blood from healthy volunteers was obtained as part of Institutional Review Board approved protocols (HUM00070190 and HUM00037943). All subjects were consented by the study team prior to the scheduled blood draw in accordance with standard procedures for clinical research at the University of Michigan Rogel Cancer Center (UMRCC). Blood was drawn into 10 mL CellSave Tubes (Menarini Silicon Biosystems, USA) and used with 96 hours.

Before running samples through a microfluidic device 100, the microfluidic device 100 was prepped using a 1% (w/v) pluronic (Sigma, USA) solution that was allowed to sit for a minimum of 10 minutes after being ran through the device using a Harvard Apparatus Syringe Pump at 100 μL/min. After preparation, the samples were loaded into a syringe and ran through the device using the same pump. Bovine serum albumin (BSA) solutions were prepped by dissolving BSA (Sigma, USA) into phosphate buffered saline (PBS). The solution was stored in a refridgerator until ready to be used.

Flow images were taken on a Nikon Eclipse LV100 Upright microscope equipped with an X-Cite Series 120Q fluorescent light box. A Harvard Apparatus Syringe Pump was used to maintain continuous flow. Flow was allowed to stabilize for a minimum of one minute, before data collection began. Multiple images were taken at the locations shown in FIGS. 2A, 2B, 2C, 2D, and 2E for each buffer solution and flow rate.

Images were analyzed using the Nikon Analysis Software. Lines were drawn across the device channel in the Nikon Analysis Software and the LUTs were exported. The LUT data was imported into MatLab where the Peaks function was used to determine the peak height and width at half-prominence.

The goal of this study was to enrich CTCs at the fastest reliable flow rate without the need for pre-processing steps. The microfluidic device 100 is a multi-section microfluidic device made using a PDMS top bonded to a glass slide, allowing for easy fabrication, high flow rates, and easy imaging. The microfluidic device 100 was designed to operate with whole blood at flow rates up to 5,000 μL/min.

The microfluidic device 100 was characterized using buffer solutions. Although there was a substantial increase in CTC concentration using the microfluidic device 100 device with PBS, it is critical to understand the effects of protein presence on cell focusing. To do this, pre-fluoresced cell lines were spiked into PBS with three concentrations of bovine serum albumin (BSA), PBS (No BSA), 3.5 g/dL BSA, and 7 g/dL BSA solutions, and then flowed through the device where focusing was observed using an inverted fluorescent microscope. These BSA solution concentrations were selected because 7 g/dL is the typical protein concentration found in blood.[36] All experiments were performed using live MCF7 breast cancer cells spiked into the corresponding BSA solution. All three solutions were tested at flow rates from 200 μL/min to 3600 μL/min to observe the effects of flow rate, Reynolds Number, and Dean's Number on focusing. BSA solutions were flowed at a variety of flow rates to allow for comparison of these solutions with that of blood based on similar Reynold's Number and Dean's Number in addition to the comparison at the same flow rate.

Figure 4A:
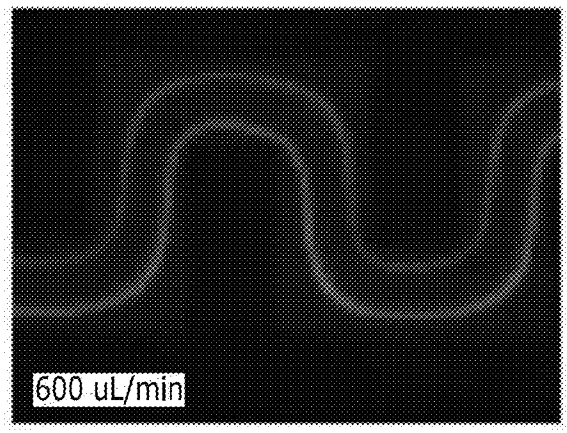
FIG. 4A is an image of pre-fluoresced MCF7 cells in the first section of the microfluidic device of FIGS. 1 and 2 at a flow rate of 600 μL/min in PBS.
Figure 4B:
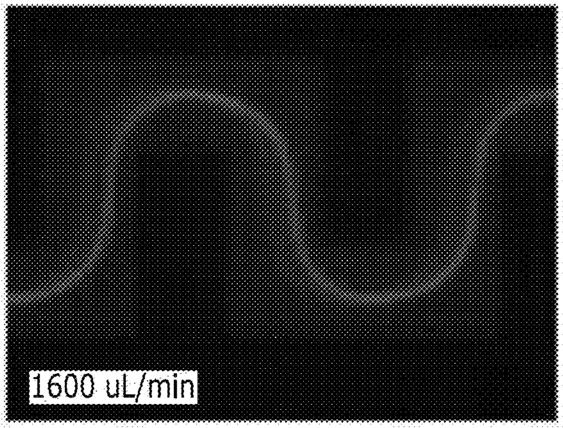
FIG. 4B is an image of pre-fluoresced MCF7 cells in the first section of the microfluidic device of FIGS. 1 and 2 at a flow rate of 1600 μL/min in PBS.
Figure 4C:
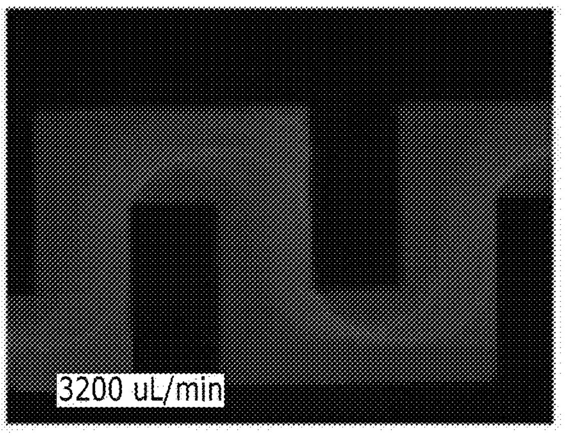
FIG. 4C is an image of pre-fluoresced MCF7 cells in the first section of the microfluidic device of FIGS. 1 and 2 at a flow rate of 3200 μL/min in PBS.
Figure 4D:
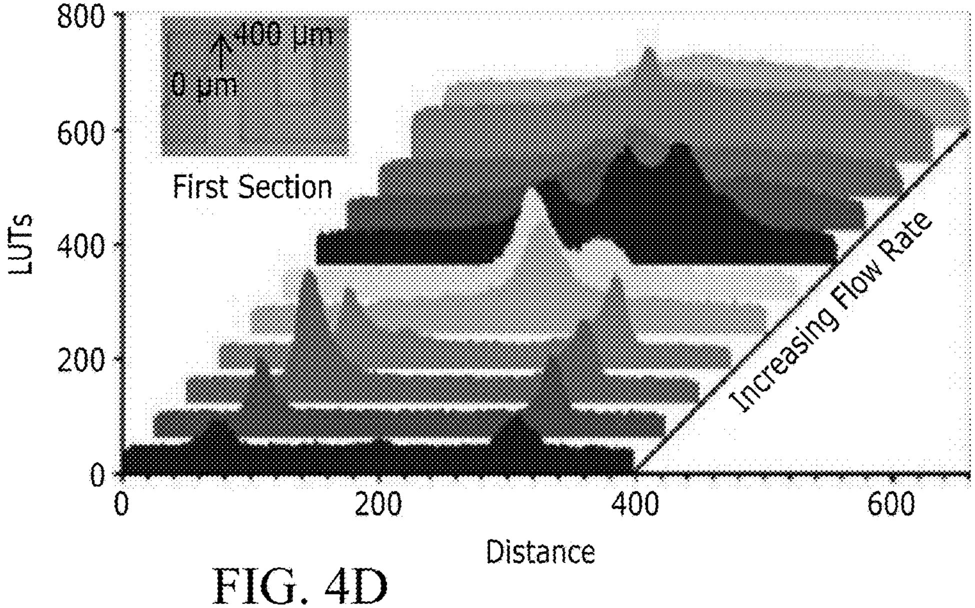
FIG. 4D is fluorescent intensity graphs at various flow rates in PBS across the shown positions in the first section of the microfluidic device of FIGS. 1 and 2.
Figure 4E:
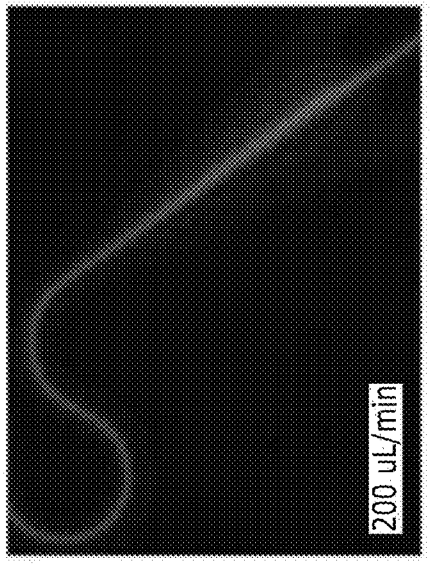
FIG. 4E is an image of pre-fluoresced MCF7 cells in the bottom outlet of the microfluidic device of FIGS. 1 and 2 at a flow rate of 200 μL/min in PBS.
Figure 4F:
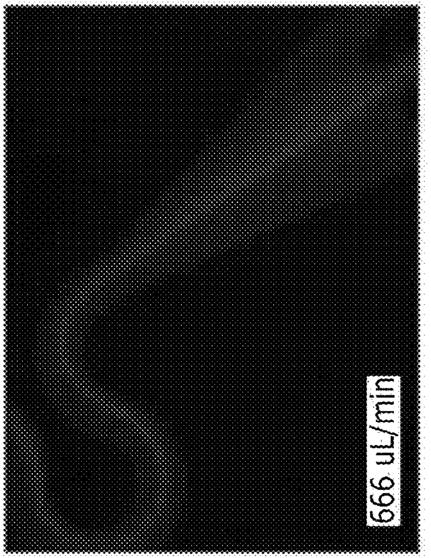
FIG. 4F is an image of pre-fluoresced MCF7 cells in the bottom outlet of the microfluidic device of FIGS. 1 and 2 at a flow rate of 666 μL/min in PBS.
Figure 4G:
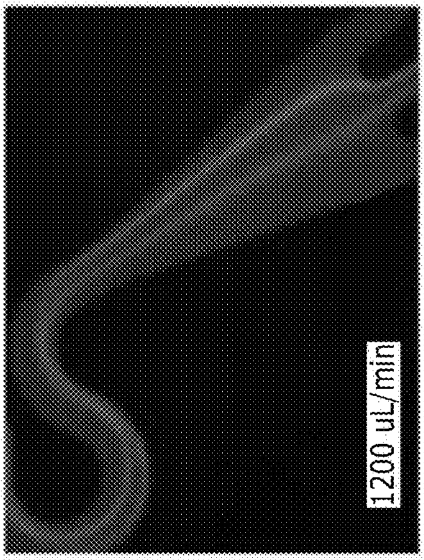
FIG. 4G is an image of pre-fluoresced MCF7 cells in the bottom outlet of the microfluidic device of FIGS. 1 and 2 at a flow rate of 1200 μL/min in PBS.

FIGS. 4A-4H present the cell focusing patterns of MCF7 cells in the No BSA condition, representing cells in pure PBS and acting as the baseline for comparisons. Images of the first section 102 of the microfluidic device 100 at flow rates of 600 μL/min, 1600 μL/min, and 3200 μL/min are shown, respectively in FIGS. 4A, 4B, and 4C. FIG. 4D shows a series of ridge plots of the LUTs across the first section 102 of the microfluidic device 100 along the line displayed on the image. Each flow rate is a horizontal line in the graph, with the peaks representing the locations of cells within the channel. The larger the peak, the higher the fluorescence at that location and hence more cells. The higher and narrower the peak, the better the focusing. The table right of the graph lists the flow rate of each graph along with the Reynold's Number for the first section and Particle Reynold's Number for WBCs and CTCs based on the estimate of 10 μm diameter particles for WBCs and 15 μm diameter particles for CTCs. This analysis was performed at two locations on the device: the first section 102 and the bottom outlet 116*c*. The first section 102 indicates the initial focusing within the microfluidic device 100. The analysis at the bottom outlet 116*c*, and specifically within the bottom central focus passageway 120*c*, demonstrates the focusing within the final product stream of the channel.

In the first section 102, two focusing streams form towards the outer walls up to a flow rate of 800 μL/min. Between 800 and 1,200 μL/min, the focusing shifts from two outer streams to a single stream close to the center of the channel. As the flow rate is increased above 1,600 μL/min, focusing decreases until it becomes non-existent and instead mixing is observed.

Figure 4H:
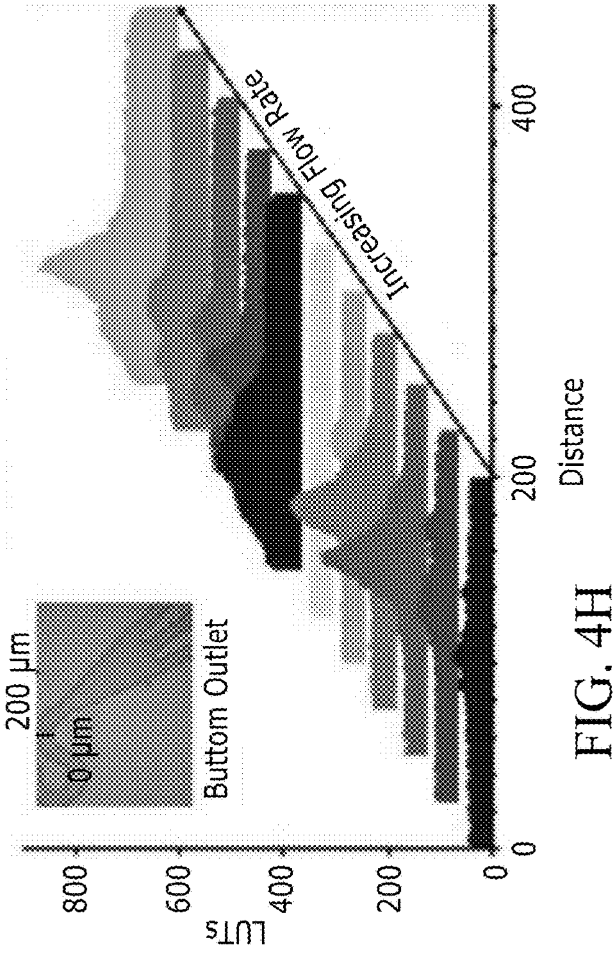
FIG. 4H is fluorescent intensity graphs at various flow rates in PBS across the shown positions in the bottom outlet of the microfluidic device of FIGS. 1 and 2.
Figure 5A:
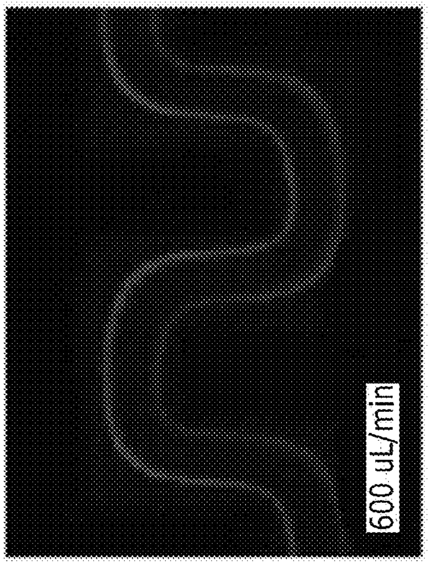
FIG. 5A is an image of pre-fluoresced MCF7 cells in the first section of the microfluidic device of FIGS. 1 and 2 at a flow rate of 600 μL/min in 3.5% BSA.
Figure 5B:
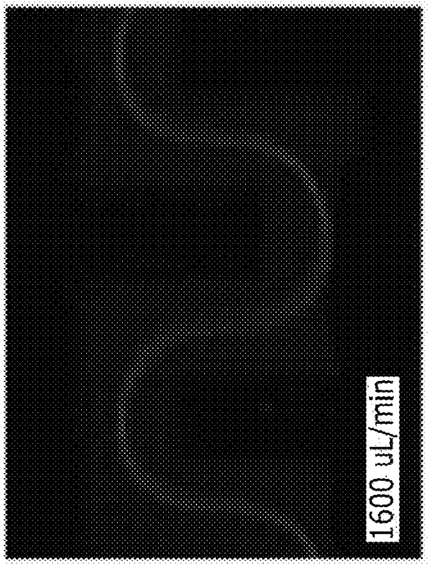
FIG. 5B is an image of pre-fluoresced MCF7 cells in the first section of the microfluidic device of FIGS. 1 and 2 at a flow rate of 1600 μL/min in 3.5% BSA.
Figure 5C:
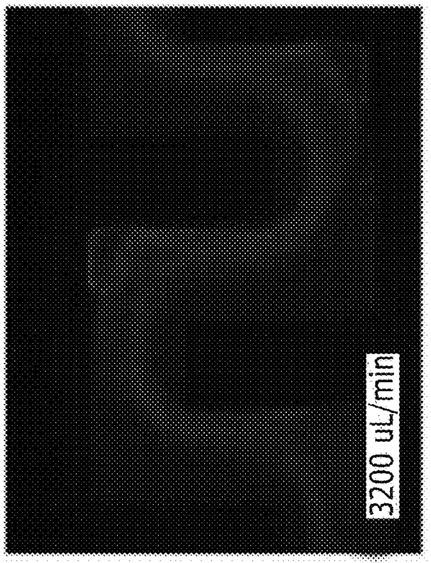
FIG. 5C is an image of pre-fluoresced MCF7 cells in the first section of the microfluidic device of FIGS. 1 and 2 at a flow rate of 3200 μL/min in 3.5% BSA.
Figure 5D:
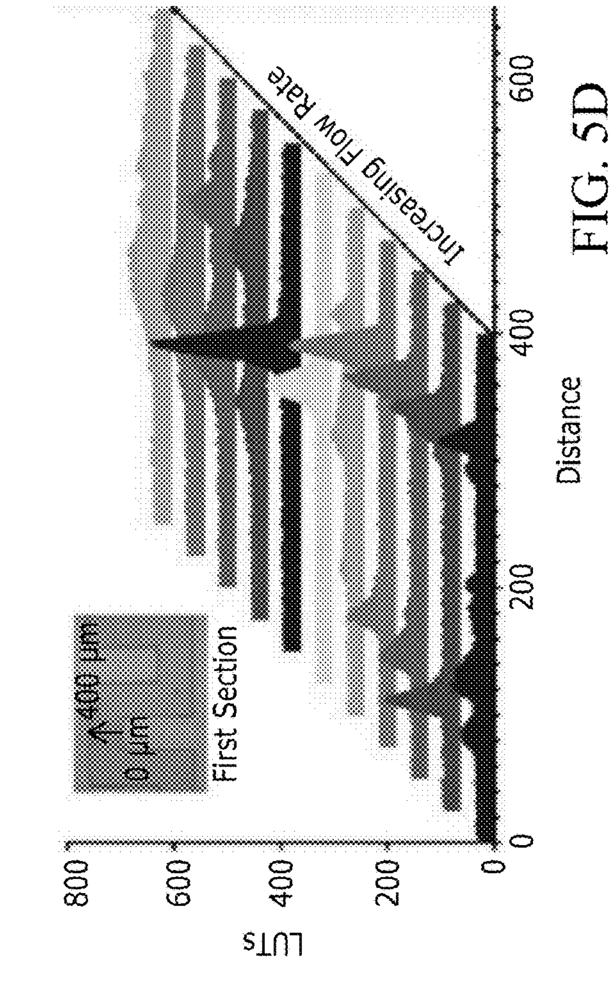
FIG. 5D is fluorescent intensity graphs at various flow rates in 3.5% BSA across the shown positions in the first section of the microfluidic device of FIGS. 1 and 2.
Figure 5E:
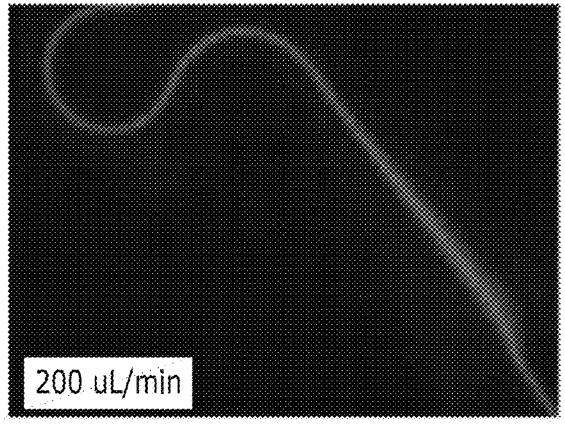
FIG. 5E is an image of pre-fluoresced MCF7 cells in the bottom outlet of the microfluidic device of FIGS. 1 and 2 at a flow rate of 200 μL/min in 3.5% BSA.
Figure 5F:
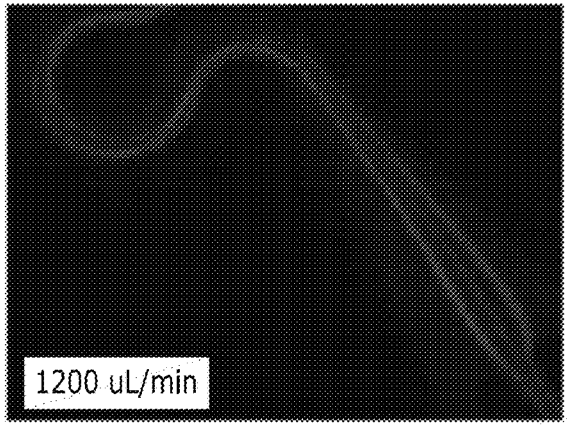
FIG. 5F is an image of pre-fluoresced MCF7 cells in the bottom outlet of the microfluidic device of FIGS. 1 and 2 at a flow rate of 1200 μL/min in 3.5% BSA.
Figure 5G:
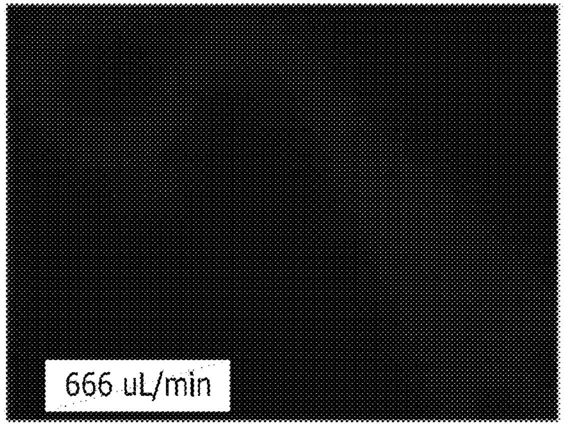
FIG. 5G is an image of pre-fluoresced MCF7 cells in the bottom outlet of the microfluidic device of FIGS. 1 and 2 at a flow rate of 666 μL/min in 3.5% BSA.
Figure 5H:
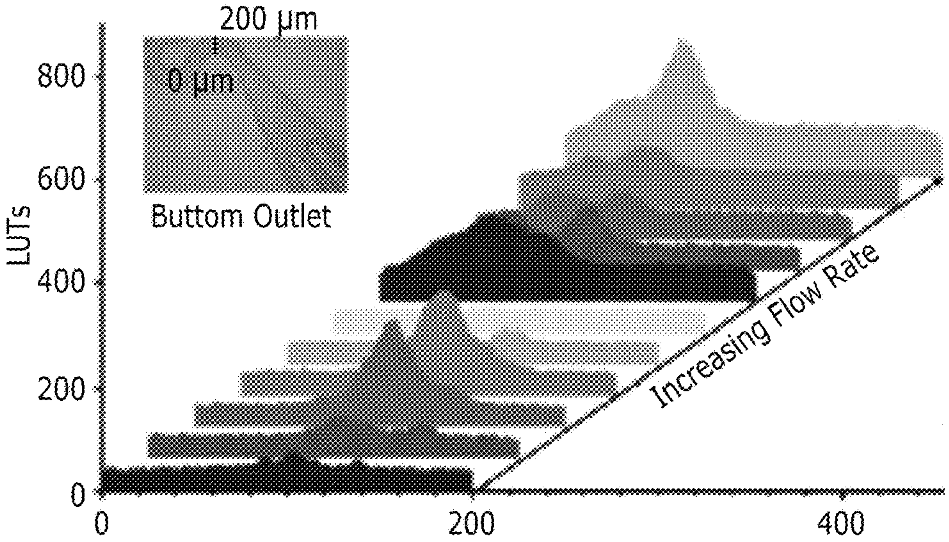
FIG. 5H is fluorescent intensity graphs at various flow rates in 3.5% BSA across the shown positions in the bottom outlet of the microfluidic device of FIGS. 1 and 2.
Figure 6A:
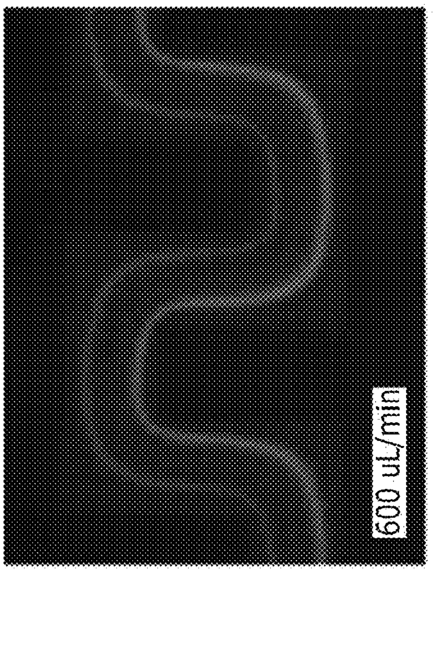
FIG. 6A is an image of pre-fluoresced MCF7 cells in the first section of the microfluidic device of FIGS. 1 and 2 at a flow rate of 600 μL/min in 7% BSA.
Figure 6B:
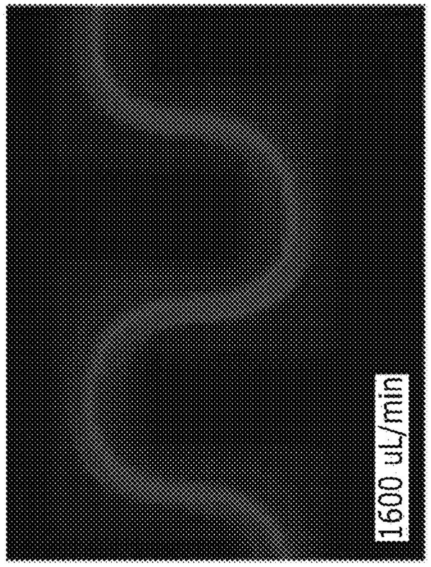
FIG. 6B is an image of pre-fluoresced MCF7 cells in the first section of the microfluidic device of FIGS. 1 and 2 at a flow rate of 1600 μL/min in 7 BSA.
Figure 6C:
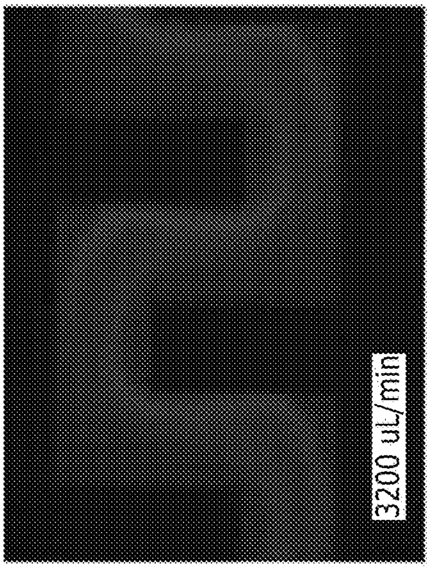
FIG. 6C is an image of pre-fluoresced MCF7 cells in the first section of the microfluidic device of FIGS. 1 and 2 at a flow rate of 3200 μL/min in 7 BSA.
Figure 6D:
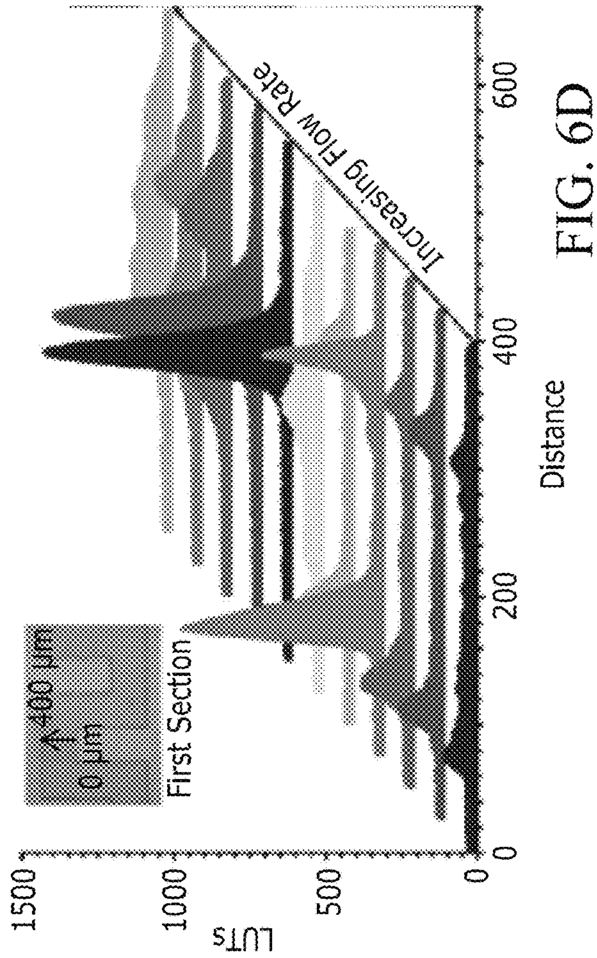
FIG. 6D is fluorescent intensity graphs at various flow rates in 7% BSA across the shown positions in the first section of the microfluidic device of FIGS. 1 and 2.
Figure 6E:
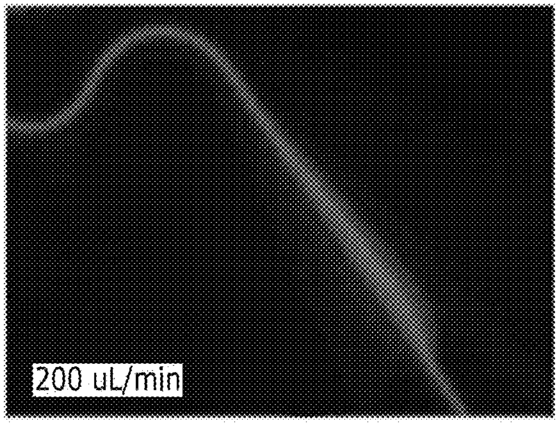
FIG. 6E is an image of pre-fluoresced MCF7 cells in the bottom outlet of the microfluidic device of FIGS. 1 and 2 at a flow rate of 200 μL/min in 7% BSA.
Figure 6F:
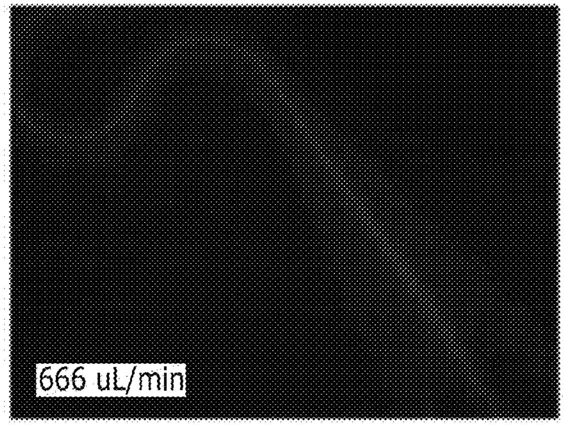
FIG. 6F is an image of pre-fluoresced MCF7 cells in the bottom outlet of the microfluidic device of FIGS. 1 and 2 at a flow rate of 666 μL/min in 7 BSA.
Figure 6G:
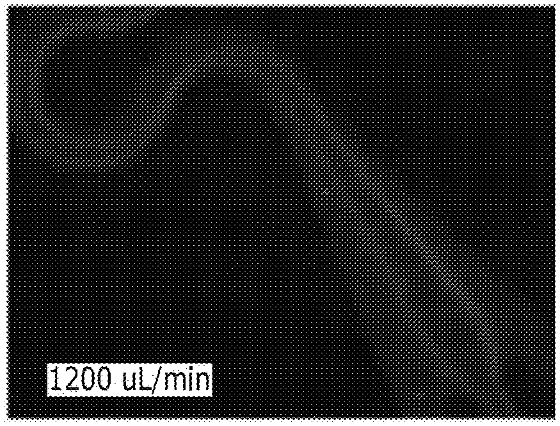
FIG. 6G is an image of pre-fluoresced MCF7 cells in the bottom outlet of the microfluidic device of FIGS. 1 and 2 at a flow rate of 1200 μL/min in 7% BSA.
Figure 6H:
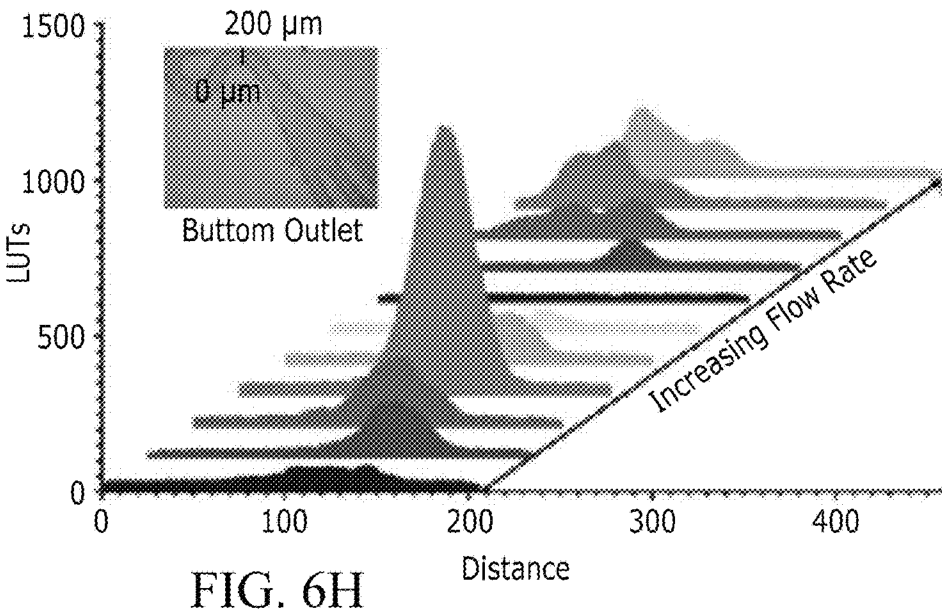
FIG. 6H is fluorescent intensity graphs at various flow rates in 7% BSA across the shown positions in the bottom outlet of the microfluidic device of FIGS. 1 and 2.

Similar to FIGS. 4A-4D, the same analysis is shown for the bottom outlet of the device in FIGS. 4E-4H. The flow rates listed in FIG. 4H correspond to the flow rates in FIG. 4D. As discussed above, the first section 102 of the microfluidic device 100 splits the flow into three streams—the top flow channel 110*a*, the middle flow channel 110*b*, and the bottom flow channel 110*c*. The channels 110*a*, 110*b*, and 110*c* behave similarly but the bottom flow channel 110*c* and bottom outlet 116*c* are discussed here. The flow rates listed for the bottom outlet 116*c* are approximations. For focusing to be observed in the bottom outlet 116*c*, MCF7 cells must have focused to the bottom flow channel 110*c* or the bottom outlet 116*c* does not have any cells in it to focus. For example, at 1,600 μL/min, MCF7 cells focus to the center of the device so no cells are present at 379 μL/min in the bottom flow channel 110*c*. FIG. 4H includes the Dean's Number at 300 μm radii of curvature which corresponds to the center line of the device.

In the bottom flow channel 110*c* of the microfluidic device 100, MCF7 cells focus into one streamline that shifts from an outer wall towards an inner wall of the bottom flow channel 110*c* with increasing flow rate. The focusing peak becomes narrower and more distinct until around 142 μL/min after which it begins to widen. Even though the peak shifts across the bottom flow channel 110*c* at the center of the curve, the MCF7 cells remain directed towards the bottom central focus passageway 120*c* as shown in FIG. 2*c*.

Similar to FIGS. 4A-H, FIGS. 5A-H show the focusing of MCF7 cells in a 3.5 g/dL BSA solution. This concentration is the halfway point between no protein and a typical concentration of protein in whole blood. At flow rates below 800 μL/min, MCF7 cells in the first section 102 focus toward the top flow channel 110*a* and the bottom flow channel 110*c*. As the flow rate is increased, focusing is lost then reforms near the middle channel 110*b* at 1,600 μL/min. At 2,000 μL/min, the focusing starts to decrease until mixing occurs.

In the bottom outlet 116*c* of the device, the focusing patterns are similar to those observed in the No BSA condition. Focusing occurs in the center of the bottom flow channel 110*c* until 190 μL/min. At 569 μL/min, focusing has shifted towards an inner wall of the bottom flow channel 110*c* and continues to do so as flow rate is increased. Even as the focusing shifts toward the inner wall of the bottom flow channel 110*c*, MCF7 cells are still directed toward the bottom central focus passageway 120*c*.

Focusing in a 7 g/dL BSA solution, which approximates the total protein concentration in whole blood, is shown in FIGS. 6A-6H. This analysis mirrors what was performed for the No BSA and 3.5 g/dL BSA solutions shown in FIGS. 4A-H and 5A-H. MCF7 cells do not focus in 7 g/dL BSA at 200 μL/min but do focus to two streamlines towards outer walls of the first section 102 between 400 μL/min and 1,200 μL/min. By 2,000 μL/min, MCF7 cells are focused into a single stream near the center of the single flow channel 106. Above 2,400 μL/min, this focusing decreases until mixing occurs.

Focusing of MCF7 cells in the bottom outlet 116*c* is similar to that observed in No BSA and 3.5 g/dL BSA solutions. MCF7 cells focus to a single streamline that becomes more distinct as flow rate is increased to 190 μL/min. Above 474 μL/min, the focusing of MCF7 cells becomes less distinct. As flow rate is increased, the focused streamline slowly shifts from an inner wall toward an outer wall of the bottom flow channel 110*c* but continues to be directed to the bottom central focus passageway 120*c*.

To test the focusing of cells in whole blood, MCF7 cells were spiked into whole blood and flown through the microfluidic device 100 device at various flow rates. Focusing of MCF7 cells at the first split 114*a* is shown in FIGS. 7A-D. The flow rate is listed above the image and the Reynold's number below each image. At 800 μL/min, MCF7 cells focus to the center of the first split 114*a*. As the flow rate increases, the focusing splits into two streamlines as the flow rate approaches 2,000 μL/min. The streamlines continue to become more distinct and shift slightly further out with increasing flow rate. Due to pressure limitations of the PDMS to glass bond, flow rates were only tested up to 2,600 μL/min. In the second section of the device, MCF7 cells continue to focus to the center as was seen in FIGS. 4A-6H.

As shown in FIGS. 8 and 8A-8D, the microfluidic device 100 device was designed to operate with whole blood at 2,400 μL/min. At this flow rate, the MCF7 cells focus to the outer two walls of the single flow channel 106 in the first section 102 and the center of the top flow channel 110*a*, middle flow channel 110*b*, and bottom flow channel 110*c* in the second section 104. Distinct streamlines are observed in both sections of the device indicating that focusing occurs. The focusing wavers toward the middle of the single flow channel 106 of the first section 102 if the flow rate is decreased to 2,000 μL/min but remains in the outer two channels (i.e., top flow channel 110*a* and bottom flow channel 110*c*) with small fluctuations in flow rate.

When operated at 2,400 μL/min, the flow rate out of the collected portion of the bottom outlet 116*c* is approximately 200 μL/min which lies within our target range of 100 μL/min-300 μL/min. This target range was selected because it is the typical inlet flow rate range for other CTC isolation devices. With the CTC enriched blood at this flow rate, it can be directly processed using an established CTC isolation technology.

Inertial focusing is influenced by a variety of factors including velocity, density, viscosity, aspect ratio, and particle size. Although MCF7 cells tend to focus towards the center of the top flow channel 110*a*, middle flow channel 110*b*, and bottom flow channel 110*c* in the second section 102 of the microfluidic device 100, the focusing patterns still differ depending on the media. FIGS. 9A-9D show images of the bottom outlet 116*c* at an inlet flow rate of 2,400 μL/min which corresponds to a flow rate of 800 μL/min in the bottom outlet. At this flow rate, MCF7 cells focus to two streams, both directed towards the bottom central focus passageway 120*c* in the No BSA and 3.5 g/dL BSA solutions, while a single focusing stream is observed in the 7 g/dL BSA solution and in whole blood.

The various factors that affect focusing were simultaneously compared by graphing Reynold's Number vs Dean's Number for samples from all three BSA solutions in FIG. 10. This graph demonstrates that in the second section of the device focusing of a single tight streamline occurs as long as both the Reynold's Number and Dean's Number are low enough. The Reynold's Number and Dean's Number for the whole blood image shown in FIGS. 9A-9D is also marked on this graph. At this flow rate, MCF7 cells form a single wide peak at the bottom outlet 116*c* even though the Reynold's Number and Dean's Number are low enough for a tight single peak to form based on the BSA solution data. This observed difference is likely due to the high number of particle interactions that occur in whole blood. These particle interactions may prevent the MCF7 cells from forming as tight of a streamline due to steric hindrance in the solution.

Figure 11A:
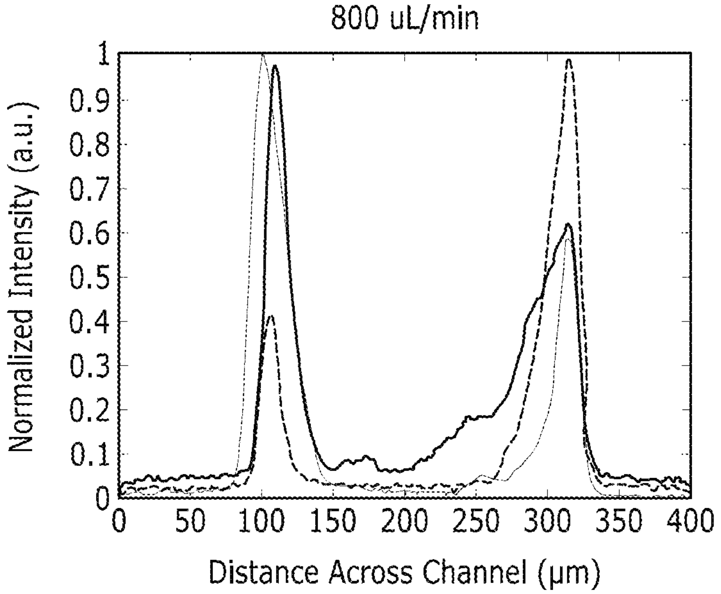
FIG. 11A is a peak width at half-prominence graph in the first section of the microfluidic device of FIGS. 1, 2, and 8 at a flow rate of 800 μL/min.
Figure 11B:
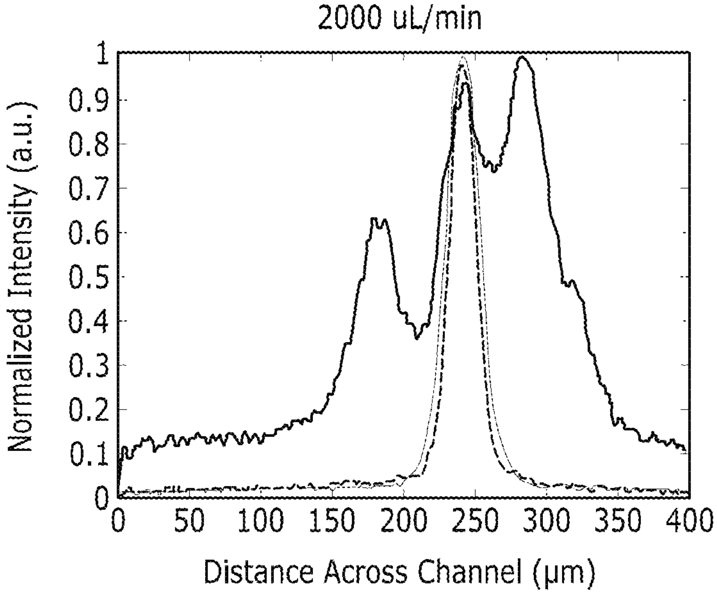
FIG. 11B is a peak width at half-prominence graph in the first section of the microfluidic device of FIGS. 1, 2, and 8 at a flow rate of 2000 μL/min.
Figure 11C:
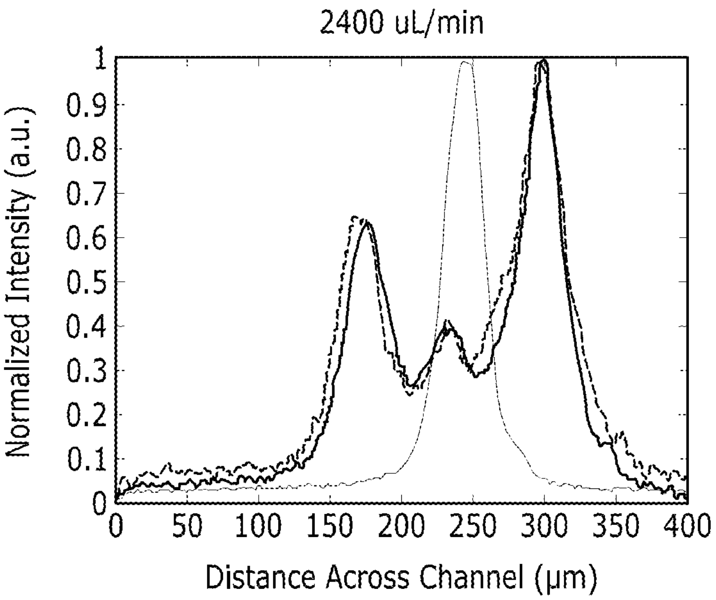
FIG. 11C is a peak width at half-prominence graph in the first section of the microfluidic device of FIGS. 1, 2, and 8 at a flow rate of 2400 μL/min.
Figure 12:
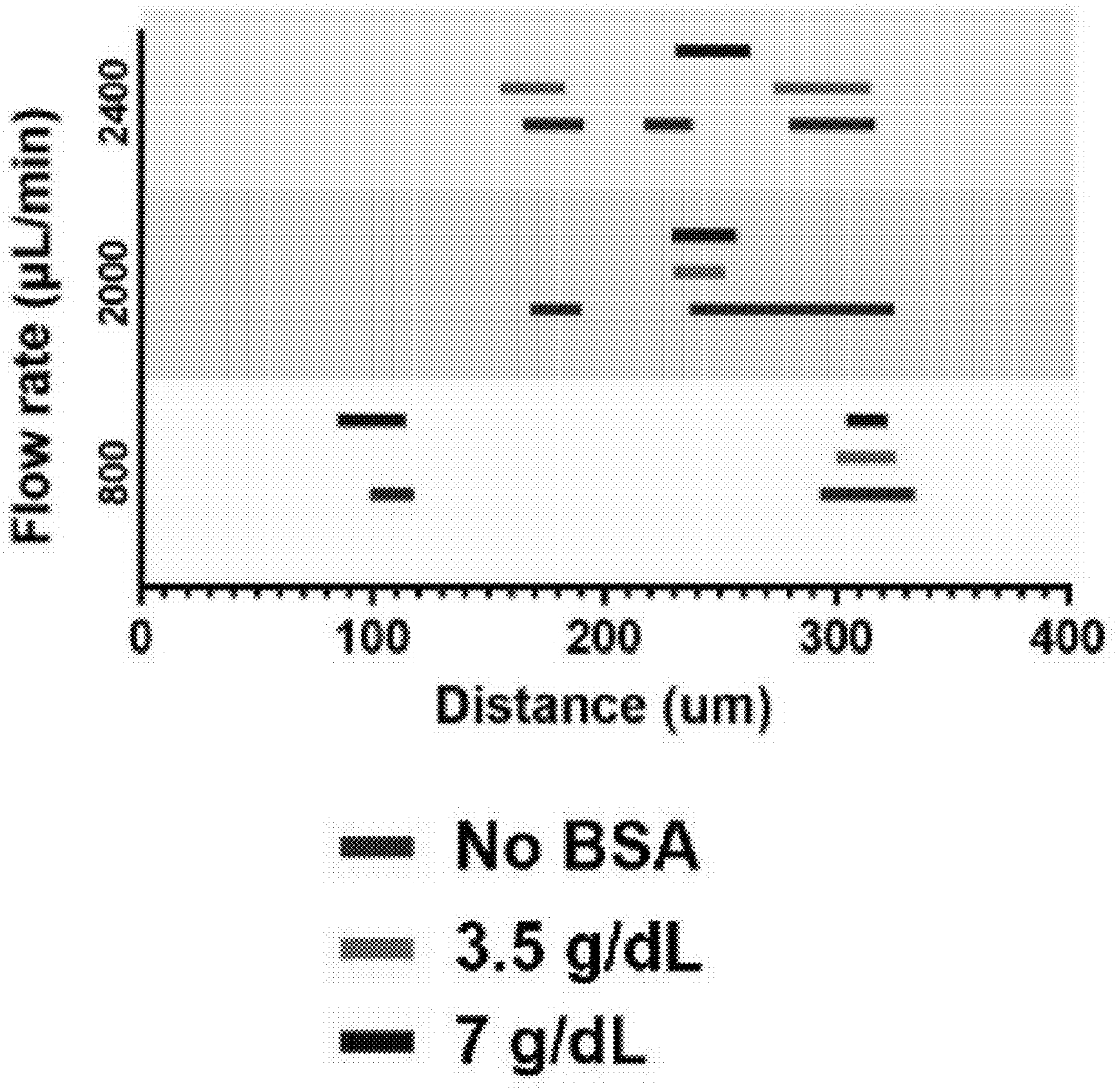
FIG. 12 is normalized fluorescent intensity graphs for each BSA condition from the first section of the microfluidic device of FIGS. 1, 2, and 8.
Figure 13A:
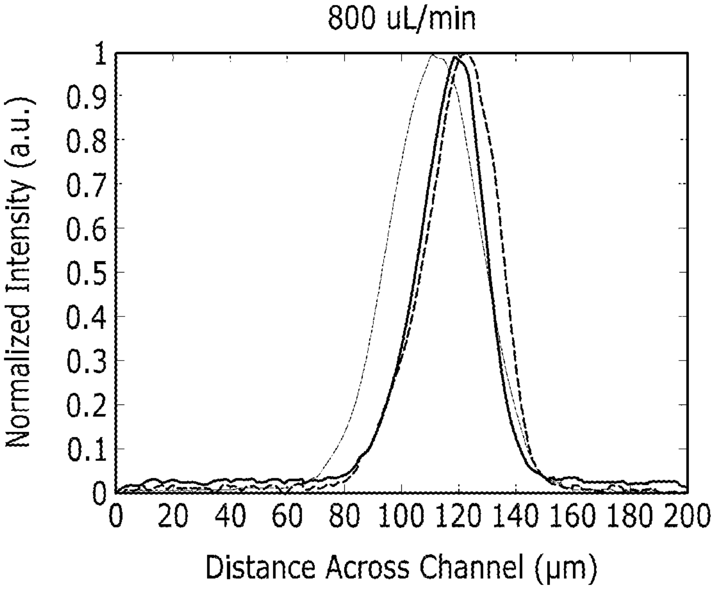
FIG. 13A is a peak width at half-prominence graph in the bottom outlet of the microfluidic device of FIGS. 1, 2, and 8 at a flow rate of 800 μL/min.
Figure 13B:
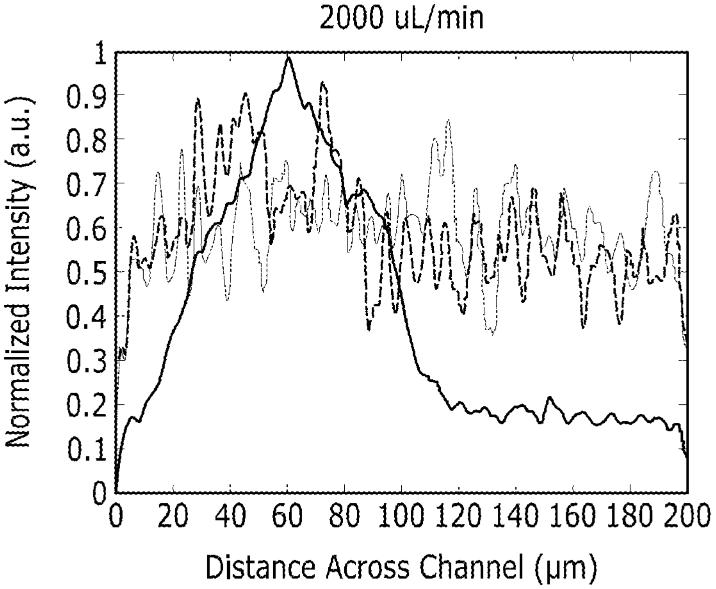
FIG. 13B is a peak width at half-prominence graph in the bottom outlet of the microfluidic device of FIGS. 1, 2, and 8 at a flow rate of 2000 μL/min.
Figure 13C:
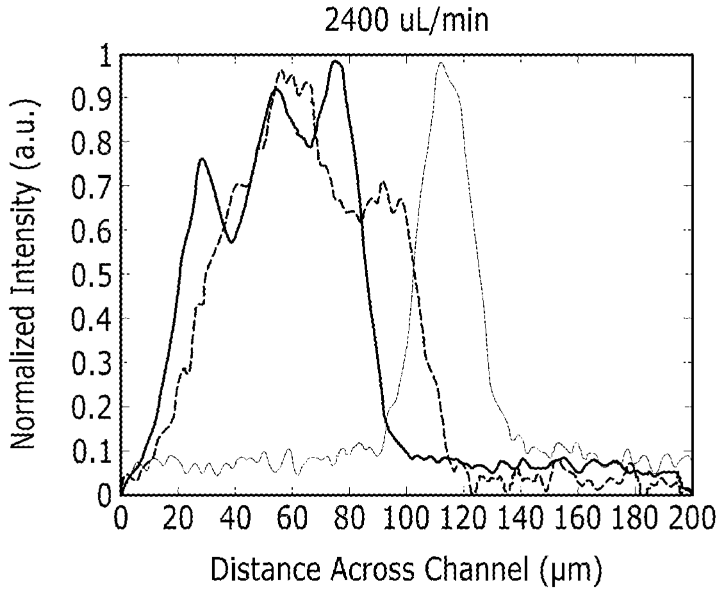
FIG. 13C is a peak width at half-prominence graph in the bottom outlet of the microfluidic device of FIGS. 1, 2, and 8 at a flow rate of 2400 μL/min.
Figure 14:
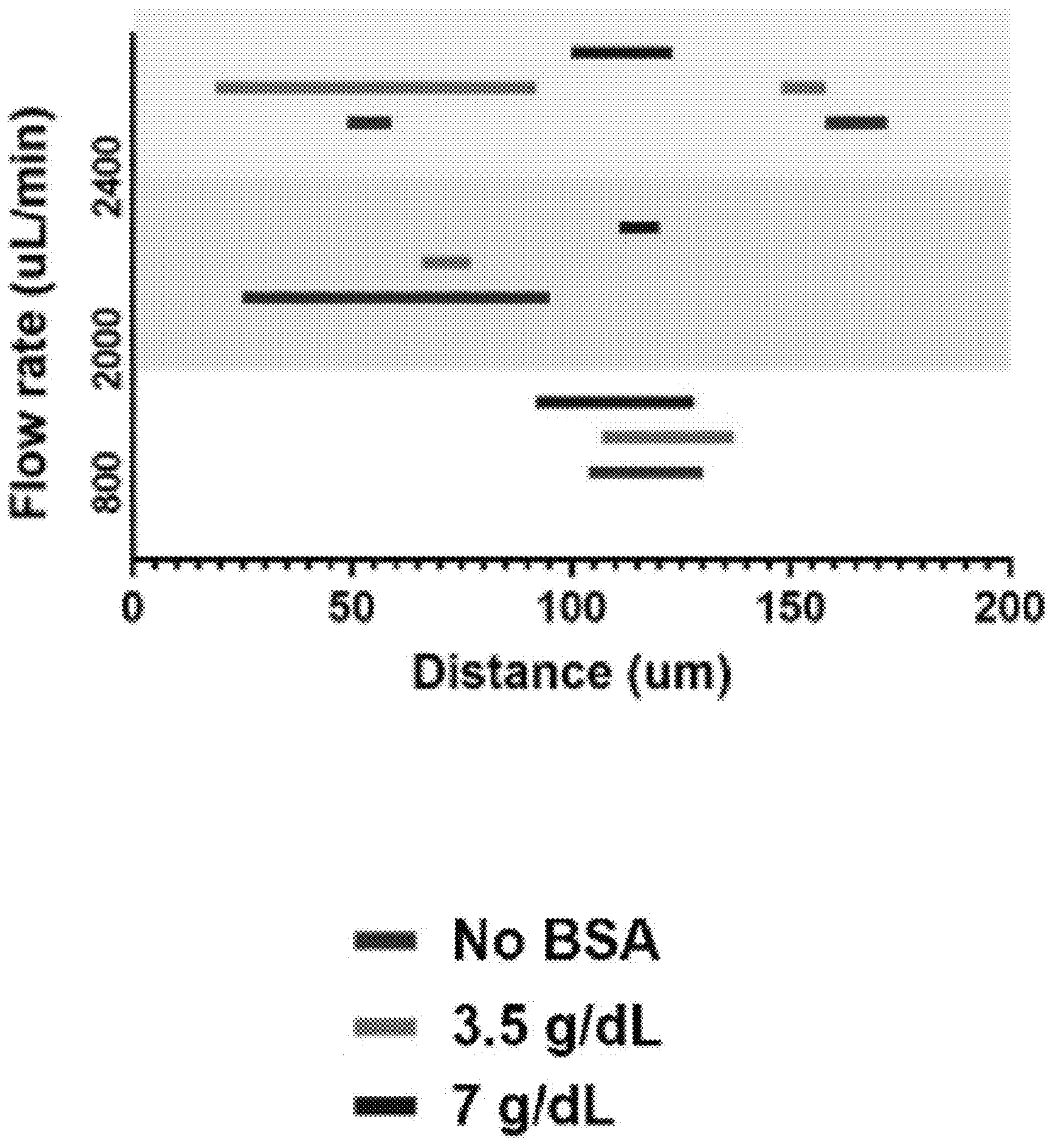
FIG. 14 is normalized fluorescent intensity graphs for each BSA condition from bottom outlet of the microfluidic device of FIGS. 1, 2, and 8.
Figure 15:
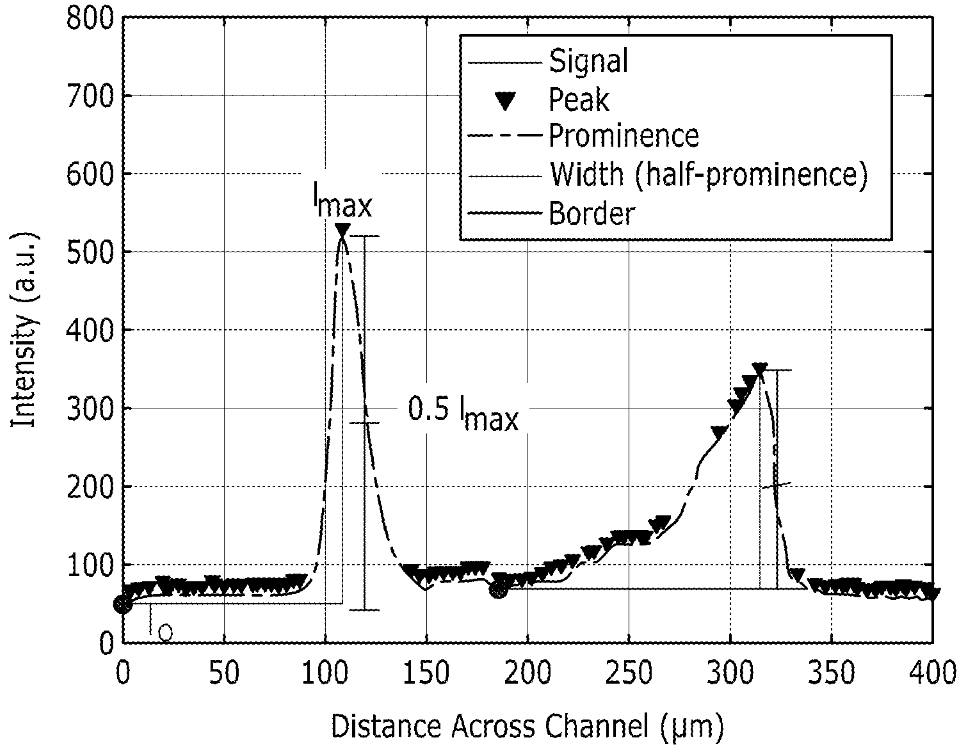
FIG. 15 is a graph marking peak and width at half-prominence definitions.

To better compare the focusing patterns between solutions and flow rates, the fluorescence intensities were graphed using the FindPeaks function in MATLAB. This function smooths out the curve and provides information about the peaks as shown in FIG. 15. The peak intensity, location, and width at half-prominence were exported. FIGS. 11A-C show the MATLAB graphs at the specified flow rates for the first section of the device. FIG. 12 graphs the locations and width at half-prominence for each condition, allowing for comparisons to be made. The peak height represents the number of cells that are found in each peak while the width at half-prominence is a good indicator of how focused the cells are in each peak. A smaller width at half-prominence demonstrates that the focused cells form a tight streamline for that peak.

At 800 μL/min all three BSA solutions produce two peaks in the first section of the device with the right peak having slightly more cells in the 3.5 g/dL BSA solution, while the left peak has more cells in the 7 g/dL BSA solution as shown in FIGS. 11A-C. It is unclear why this shift in focusing occurs. To validate the shift, the same batch of cells was used at increasing concentrations of BSA on the same day for the graphs shown and each graph is the average of three separate images. At 2,000 μL/min, MCF7 cells do not focus in the No BSA solution, have some focusing in the 3.5 g/dL BSA solution, but form a single tight streamline in the 7 g/dL BSA solution. Similarly, at 2,400 μL/min, the cells form a single tight streamline in the 7 g/dL BSA solution; however, they do not focus in the 3.5 g/dL solution but form two streamlines in the No BSA solution. The fluid properties that define Reynold's Number and Dean's Number vary slightly between these three solutions but not enough to account for the drastic change in focusing that occurs between the fluids, indicating that other factors affect inertial focusing of MCF7 cells more than has been accounted for previously. One possibility is that the varying protein concentrations effect cell properties such that the deformability varies enough between these solutions to drastically change the focusing patterns.

The same program was used to compare the focusing in the second section of the device. The graph results from this comparison are shown in FIGS. 13A-C and 14. Unlike in the first section, single peaks form in roughly the same position for all three BSA solutions. At 2,000 μL/min, MCF7 cells focus extremely well to the center channel so there are not cells in the bottom outlet to be focused in the 3.5 g/dL and 7 g/dL BSA solutions. Based on the peak widths at half-prominence, focusing becomes more distinct with increasing flow rate. If flow rate continues to increase, focusing begins to be lost as the peak becomes wider (FIGS. 2A-6H).

Previous work has indicated that focusing occurs when the particle Reynold's number is greater than one; however, in the microfluidic device 100, focusing often occurs even if the particle Reynold's number is significantly less than one.

This same phenomenon has been observed in other serpentine channels, indicating that this criteria is not applicable to all systems.

Although Reynold's Number and Dean's Number are often used to quantify flow in inertial systems, this study demonstrates that they are not sufficient for all systems. In the second section 104 of the microfluidic device 100 where Dean's number is defined, cell focusing is similar for all three BSA solutions; however, in the first section 102 of the microfluidic device 100, this does not hold, indicating there are more factors that help define focusing when right corners are present. The increased protein concentration could lead to changes in particle properties as well as other fluid properties often neglected in inertial microfluidics such as fluid elasticity and rheology.

The study demonstrates the ability to inertially focus cells in whole blood. Previous devices have focused particles in microfluidic channels, but none targeted the focusing of cells in whole blood, which introduces several additional factors that affect the focusing pattern: particle interactions, shear thinning, elastic forces, and particle deformability. The microfluidic device 100 is able to focus cells in whole blood at a high flow rate, 2.4 mL/min. The dual stage strategy allows a high percentage of cells to be focused while also dramatically reducing the volume of CTC containing fluid. Using the microfluidic device 100, the blood volume that can be processed by other CTC isolation technologies can be increased 5-fold.

The focusing patterns that occur in three different BSA solutions were compared to those in whole blood to better distinguish the changes that occur due to the particle interactions present in blood. Despite their differences, the focusing patterns of all three BSA solutions are more similar to each other than the focusing that occurs in whole blood. From this observation, the conclusion follows that the particle interactions are important to the changes in focusing patterns even though they are not the sole contributor to differences in focusing between whole blood and the No BSA solution.

The ability to focus cells from whole blood directly without any dilutions can enable enrichment of CTCs in vivo, which should open new opportunities for continuous blood monitoring. Additionally, the microfluidic device 100 device can concentrate the CTCs from whole blood in a label free fashion, which then can be further purified using other low throughput but highly specific methods. The 5-fold enrichment of CTCs from 10 mL of blood in just over 4 minutes using the microfluidic device 100 device enables the processing of large blood volumes. The microfluidic device 100 drastically increases the blood volume that can be processed while maintaining the ability to form meaningful clinical assays such as molecular characterization on the isolated CTCs. This increase in sample size will lead to both better prognosis and improve targeted therapy selection for patients.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed is:

1. A microfluidic device for focusing circulating tumor cells (CTC) from whole blood without a sheath buffer, the microfluidic device comprising:

a first section including a single flow channel, the single flow channel including a plurality of square corners; and a second section in fluid communication with the first section, the second section including at least one flow channel including a plurality of curves, characterized in that each of the at least one flow channel curves in a first direction around a first center point at a first longitudinal location and then curves in a second direction around a second center point at a second longitudinal direction downstream of the first longitudinal location, with the first direction and the second direction being substantially opposite one another so as to result in a serpentine arrangement.

2. The microfluidic device of claim 1, the single flow channel of the first section dividing at a first split of the second section into a top flow channel, a middle flow channel, and a bottom flow channel, the top flow channel including a plurality of curves positioned in a serpentine arrangement, the middle flow channel including a first segment and a second segment, each of the first segment and the second segment including a plurality of curves positioned in a serpentine arrangement, and the bottom flow channel including a plurality of curves positioned in a serpentine arrangement.

3. The microfluidic device of claim 2, the top flow channel tapering at a top outlet to two top outer waste passageways and a top central focus passageway, the first segment tapering at a second split into two primary middle outer waste passageways and the second segment, the second segment tapering at a middle outlet into two secondary middle outer waste passageways and a middle central focus passageway, and the bottom flow channel tapering at a bottom outlet to two bottom outer waste passageways and a bottom central focus passageway.

4. The microfluidic device of claim 1, the microfluidic device further comprising a pump configured to pump whole blood through the first section and the second section at a flow rate between 1.0 and 5.0 mL/min.

5. The microfluidic device of claim 1, the single flow channel of the first section having a width between 350 μm and 450 μm.

6. The microfluidic device of claim 1, the single flow channel having a length between 43 mm and 53 mm.

7. The microfluidic device of claim 1, the number of the plurality of square corners of the single flow channel being between 55 and 65.

8. The microfluidic device of claim 2, the top flow channel, the first segment and the second segment of the middle flow channel, and the bottom flow channel all having a width between 50 μm and 250 μm.

9. The microfluidic device of claim 2, the plurality of curves of the top flow channel, the first segment and the second segment of the middle flow channel, and the bottom flow channel each having a radius between 150 μm and 350 μm.

10. The microfluidic device of claim 2, the number of the plurality of curves of the top flow channel being between 20 and 24 and the number of the plurality of curves of the bottom flow channel being between 20 and 24.

11. The microfluidic device of claim 2, the number of the plurality of curves of the first segment of the middle flow channel being between 11 and 16, and the number of the plurality of curves of the second segment of the middle flow channel being between 11 and 16.

12. The microfluidic device of claim 2, the single flow channel, the top flow channel, the middle flow channel, and the bottom flow channel all having a height between 50 μm and 125 μm.

13. A method of focusing circulating tumor cells (CTC) from whole blood using the microfluidic device of claim 1, the method comprising:

providing a whole blood sample and a microfluidic device, the microfluidic device having a first section including a single flow channel, the single flow channel including a plurality of square corners, and a second section in fluid communication with the first section, the second section including a first split where the single flow channel of the first section divides into a top flow channel, a middle flow channel, and a bottom flow channel, each of the top flow channel, the middle flow channel, and the bottom flow channel including a plurality of curves positioned in a serpentine arrangement;

pumping the whole blood sample through the microfluidic device at a flow rate between 1.0 and 5.0 mL/min; and separating CTC enriched blood from waste.

14. The method of claim 13, the CTC enriched blood having a volume that is 25% or less of a volume of the whole blood sample.

15. The method of claim 13, further comprising at the first split, flowing between 20% and 30% of the whole blood sample by volume through the top flow channel, flowing between 20% and 30% of the whole blood sample by volume through the bottom flow channel, and flowing between 40% and 60% of the whole blood sample by volume through the middle flow channel.

16. The method of claim 13, the top flow channel tapering at a top outlet, the bottom flow channel tapering in a bottom outlet, and the middle flow channel including a first segment, a second split, a second segment, and a middle outlet, and at each of the top outlet, the bottom outlet, the second split, and the middle outlet, directing between 60% and 70% of the whole blood sample by volume into waste passageways and 40-30% of the whole blood sample by volume into focus passageways as CTC enhanced blood.

17. The method of claim 16, further comprising directing the CTC enhanced blood into a herringbone graphene oxide device (HBGO).

18. The method of claim 13, the single flow channel, the top flow channel, the middle flow channel, and the bottom flow channel all having a height between 50 μm and 125 μm.

19. The method of claim 13, the single flow channel of the first section having a width between 350 μm and 450 μm.

20. The method of claim 13, the top flow channel, the middle flow channel, and the bottom flow channel all having a width between 50 μm and 250 μm.

* * * * *